(12) United States Patent
Nakayama

(10) Patent No.: US 8,412,959 B2
(45) Date of Patent: Apr. 2, 2013

(54) TERMINAL APPARATUS, TERMINAL APPARATUS CONTROLLING METHOD, AND CONTROL PROGRAM

(75) Inventor: Tetsunori Nakayama, Tokyo (JP)

(73) Assignee: Sony Corporation, Tokyo (JP)

( * ) Notice: Subject to any disclaimer, the term of this patent is extended or adjusted under 35 U.S.C. 154(b) by 620 days.

(21) Appl. No.: 12/582,029

(22) Filed: Oct. 20, 2009

(65) Prior Publication Data

US 2010/0153594 A1    Jun. 17, 2010

(30) Foreign Application Priority Data

Dec. 11, 2008    (JP) ................ 2008-316071

(51) Int. Cl.
*G06F 1/26*    (2006.01)
*G06F 1/32*    (2006.01)
(52) U.S. Cl. ......... 713/300; 713/320; 713/330; 439/894
(58) Field of Classification Search .......... 713/300, 713/320, 330; 439/894
See application file for complete search history.

(56) References Cited

U.S. PATENT DOCUMENTS

| | | | | |
|---|---|---|---|---|
| 7,453,233 B2 * | 11/2008 | Fischer et al. | ............... | 320/111 |
| 2003/0054703 A1 * | 3/2003 | Fischer et al. | ............... | 439/894 |
| 2008/0297364 A1 * | 12/2008 | Soderland et al. | ............ | 340/654 |

FOREIGN PATENT DOCUMENTS

| | | |
|---|---|---|
| JP | 2002-49444 | 2/2002 |
| JP | 2003-280771 | 10/2003 |
| JP | 2004-69997 | 3/2004 |
| JP | 2004-280747 | 10/2004 |

OTHER PUBLICATIONS

Office Action issued Sep. 16, 2010, in Japan Patent Application No. 2008-316071.

* cited by examiner

*Primary Examiner* — Kim Huynh
*Assistant Examiner* — Michael J Brown
(74) *Attorney, Agent, or Firm* — Oblon, Spivak, McClelland, Maier & Neustadt, L.L.P.

(57) ABSTRACT

Disclosed herein is a terminal apparatus designed as a self-powered device according to the Universal Serial Bus standard, the terminal apparatus including: a battery; a USB port; and a control section configured to allow relevant components of the terminal apparatus to operate on power from the battery upon power-up, the control section further notifying a host device upon connection thereto through the USB port that the terminal apparatus is a bus-powered device, in order to request a current necessary for the relevant components to operate only on the power supplied from the host device to the bus-powered device.

16 Claims, 14 Drawing Sheets

FIG. 7

| FIELD NAME | SIZE (IN BYTES) | DESCRIPTION |
|---|---|---|
| bLength | 1 | SIZE OF THIS DESCRIPTOR |
| bDescriptorType | 1 | CONSTANT (0x02) REPRESENTING "CONFIGURATION" |
| wTotalLength | 2 | DATA SIZE |
| bNumInterfaces | 1 | NUMBER OF INTERFACES SUPPORTED BY THIS CONFIGURATION |
| bConfigurationValue | 1 | CONFIGURATION IDENTIFICATION NUMBER |
| iConfiguration | 1 | INDEX TO STRING DESCRIPTOR |
| bmAttributes | 1 | SELF-POWERED/BUS-POWERED, REMOTE WAKEUP SETTING, ETC. |
| MaxPower | 1 | NECESSARY BUS POWER |

FIG. 8 bmAttributes

D7: reserved

D6: Self-powered  --→  D6=0 → Bus-powered
D6=1 → Self-powered

D5: Remote Wakeup

D4: reserved (0)

D3: reserved (0)

D2: reserved (0)

D1: reserved (0)

D0: reserved (0)

FIG. 9

MaxPower

HALF THE MAXIMUM VALUE (mA) OF VBUS CURRENT NEEDED BY ELECTRONIC DEVICE

EX.

2mA → MaxPower=0x01
100mA → MaxPower=0x32
500mA → MaxPower=0xFA

TERMINAL APPARATUS, TERMINAL APPARATUS CONTROLLING METHOD, AND CONTROL PROGRAM

BACKGROUND OF THE INVENTION

1. Field of the Invention

The present invention relates to a terminal apparatus, a terminal apparatus controlling method, and a control program. More particularly, the invention relates to a terminal apparatus connected to a host device illustratively through a USB port.

2. Description of the Related Art

In recent years, many terminal apparatuses including digital still cameras and digital audio players have adopted the USB (Universal Serial Bus) as the interface for connecting with other devices.

With recording media getting ever larger in capacity, the above-mentioned type of terminal apparatus connected with a host device through a USB port has an increasing number of files to be exchanged with the latter. The result is a tendency toward prolonged connection time for the devices involved.

The above type of terminal apparatus contains a battery. While being connected with the host device, the terminal apparatus keeps consuming power from its battery. As the connection time is prolonged, as has been the case with the terminal apparatuses as mentioned above, the battery can go dead during the connection.

It might happen that the terminal apparatus compatible with a USB mass storage class recognized as a drive by the host device has the battery run out during file exchange with the host. If that happens in reality, there is a possibility that the data written on the recording medium of the terminal apparatus is destroyed.

For that reason, the user must keep a constant watch on the remaining battery level of the terminal apparatus while operating the host device. This has been a disadvantage to the user.

Meanwhile, according to the USB standard, it is possible for the host device to power its terminal apparatus via a signal line called VBUS. Utilizing this facility can eliminate the above-mentioned disadvantage to the user.

More specifically, the USB standard defines two kinds of devices utilizing VBUS power: devices that operate only on VBUS power, and devices operating on both VBUS power and self-supplied power.

The devices operating only on VBUS power are called bus-powered devices (Bp devices). The devices operating on both VBUS power and self-supplied power are called self-powered devices (Sp devices).

Immediately after being connected with the host device, the Bp device may draw currents of up to only 100 mA. When authenticated by the host device, the Bp device is allowed to draw currents of up to 500 mA.

On the other hand, the Sp device is allowed to draw currents of only up to 100 mA. That is, the terminal apparatus operating from its battery is not allowed to draw currents exceeding 100 mA from the host device.

Meanwhile, many of the terminal apparatuses subject to power constraints cannot operate at the current of 100 mA. If allowed to draw currents of up to 500 mA, more and more terminal apparatus may conceivably operate only on the power (5 V, 500 mA) from the host device.

However, even if the terminal apparatus notifies the host device that it is a Bp device, in order to draw the 500 mA current from the latter, the terminal apparatus must initially operate at the 100 mA current until it is authenticated by the host device.

As a solution to the above bottleneck, there has been proposed a terminal apparatus supplementing its main control unit operating at the 500 mA current with a separate control unit which communicates with the host device and which operates at the 100 mA current (e.g., see Japanese Patent Laid-open No. 2004-69997).

SUMMARY OF THE INVENTION

However, the proposed solution involving separately furnishing the additional control unit operating at the 100 mA current has the disadvantage of having a complicated and costly structure.

Meanwhile, if the terminal apparatus is an Sp device, then it can operate on its battery power and can operate while drawing the current of only 100 mA from the host device. This, however, fails to eliminate the above-mentioned disadvantage because the battery power is continuously dissipated.

As an alternative solution, the terminal apparatus may be designed to ignore the USB standard outright and draw the 500 mA current from the host device immediately after getting connected to the latter. However, this design not in compliance with the USB standard can adversely affect the host device and the USB communication protocol, so that reliable communication cannot be guaranteed.

As described above, the traditional terminal apparatus, when simply structured and designed as an Sp device, has had difficulty in reliably communicating with the host device.

The present invention has been made in view of the above circumstances and provides a terminal apparatus, a terminal apparatus controlling method and a control program, the terminal apparatus being simply structured but designed to ensure reliable communication with a host device from which to draw power.

In carrying out the present invention and according to one embodiment thereof, there is provided a terminal apparatus designed as a self-powered device according to the Universal Serial Bus standard, the terminal apparatus including: a battery; a USB port; and a control section configured to allow relevant components of the terminal apparatus to operate on power from the battery upon power-up, the control section further notifying a host device upon connection thereto through the USB port that the terminal apparatus is a bus-powered device, in order to request a current necessary for the relevant components to operate only on the power supplied from the host device to the bus-powered device.

As outlined above, the terminal apparatus of the embodiment of the present invention is a self-powered device under the USB standard. But by notifying the host device that it is a bus-powered device, the terminal apparatus can request a VBUS current of up to 500 mA from the host device.

When the current of only up to 100 mA can be acquired from the host device according to the USB standard, as is the case immediately after power-up, the inventive terminal apparatus is configured to operate on the power from the battery. This makes it possible for the terminal apparatus to operate at the current of only up to 100 mA available from the host device without furnishing an additional control unit operating at the current of up to 100 mA.

Furthermore, when the current necessary for operating the relevant components of the terminal apparatus is requested of and made available from the host device, the terminal apparatus of the embodiment of the present invention can operate on the power derived from the host device alone. This translates into minimizing the amount of the power being dissipated from the battery. That in turn makes it possible to circumvent the situation in which the power falls short during communication with the host device.

According to another embodiment of the present invention, there is provided a terminal apparatus controlling method for use with a terminal apparatus designed as a self-powered device according to the Universal Serial Bus standard and including a battery, a USB port and a control section. The terminal apparatus controlling method includes the steps of: causing the control section to allow relevant components of the terminal apparatus to operate on power from the battery upon power-up; and causing the control section to notify a host device upon connection thereto through the USB port that the terminal apparatus is a bus-powered device, in order to request a current necessary for the relevant components to operate only on the power supplied from the host device to the bus-powered device.

According to further embodiment or the present invention, there is provided a control program for performing a control procedure of a terminal apparatus designed as a self-powered device according to the Universal Serial Bus standard and including a battery, a USE port and a control section. The control procedure includes the steps of: causing the control section to allow relevant components of the terminal apparatus to operate on power from the battery upon power-up; and causing the control section to notify a host device upon connection thereto through the USB port that the terminal apparatus is a bus-powered device, in order to request a current necessary for the relevant components to operate only on the power supplied from the host device to the bus-powered device.

According to the embodiments of the present invention, the terminal apparatus designed as a self-powered device under the USB standard is configured to notify its host device that it is a bus-powered device, thereby requesting VBUS currents of up to 500 mA from the host. When the current of only up to 100 mA is made available from the host device, as is the case immediately after power-up, the inventive terminal apparatus is configured to operate on the power from its battery. This makes it possible for the terminal apparatus to operate at the current of only up to 100 mA available from the host device without furnishing an additional control unit operating at the current of up to 100 mA. Furthermore, when the current necessary for operating the relevant components of the terminal apparatus is requested of and acquired from the host device, the power available from the host device alone is sufficient for operating the relevant components. This translates into minimizing the amount of the power being dissipated from the battery. That in turn makes it possible to circumvent the situation in which the power falls short during communication with the host device. In this manner, the embodiments of the present invention provides a terminal apparatus, a terminal apparatus controlling method and a control program, the terminal apparatus being simply structured but designed to ensure reliable communication with the host device from which power is supplied.

BRIEF DESCRIPTION OF THE DRAWINGS

Further features and advantages of the present invention will become apparent upon a reading of the following description and appended drawings in which:

FIG. 7 is a tabular view listing the contents of a configuration descriptor;

FIG. 8 is a schematic view explanatory of the description of bmAttributes;

FIG. 9 is a schematic view explanatory of the description of MaxPower;

DETAILED DESCRIPTION OF THE PREFERRED EMBODIMENTS

The following preferred embodiments of the present invention will now be described with reference to the accompanying drawings:

1. First embodiment
2. Second embodiment
3. Third embodiment
4. Other embodiments 1. First Embodiment 1-1. Overview of the First Embodiment The first embodiment of the present invention is outlined below. The description of the overview of the first embodiment will be followed by an explanation of a specific example of the first embodiment.

Figure 1:
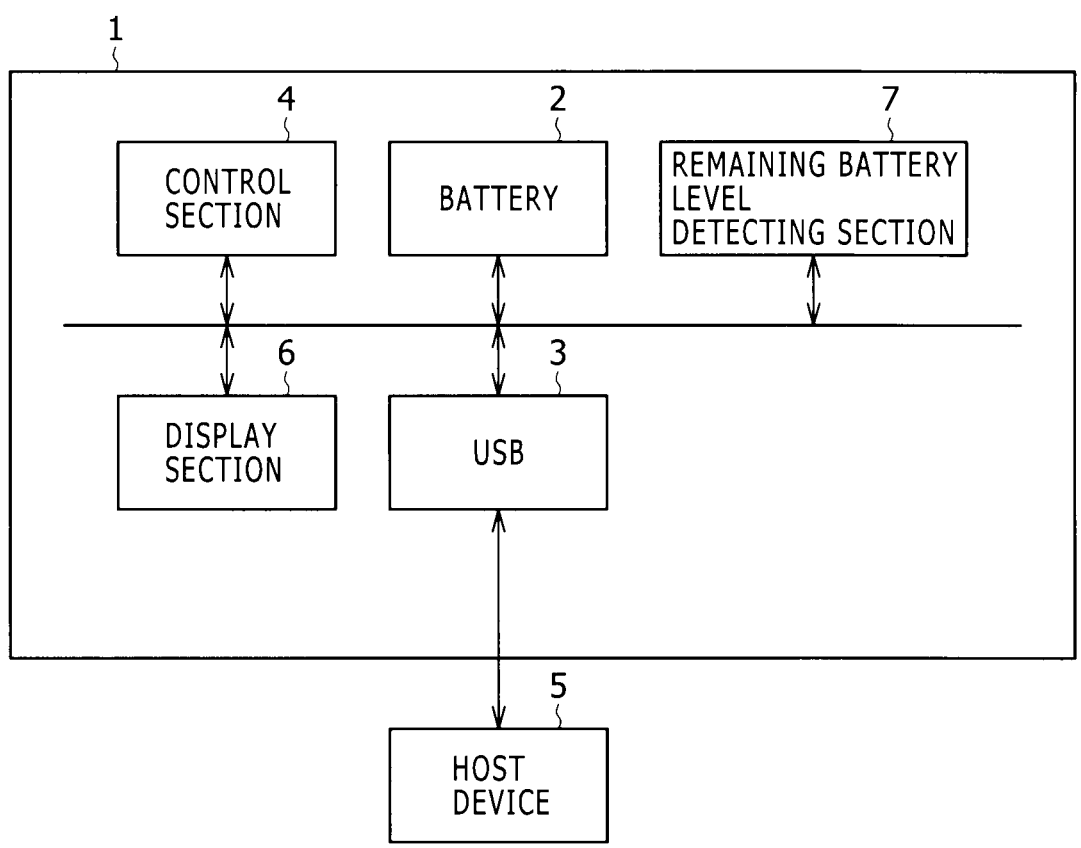
FIG. 1 is a block diagram showing an overall functional structure of a terminal apparatus practiced as a first embodiment of the present invention.

In FIG. 1, reference numeral 1 stands for a terminal apparatus practiced as the first embodiment of the present invention. The terminal apparatus 1 includes a battery 2, a USB port 3, and a control section 4.

The battery 2 is typically a detachable battery that supplies power necessary for operating the terminal apparatus 1. The USB port 3 provides an interface between the terminal apparatus 1 and a host device 5. As such, the USE port 3 permits communication with the host device 5 and ensures the supply of power from the host.

Upon power-up, the control section 4 causes relevant components of the terminal apparatus 1 to operate on the power from the battery 2. Thereafter, if the terminal apparatus 1 is connected with the host device 5 via the USB port 3, then the control section 4 notifies the host device 5 that the terminal apparatus 1 is a Bp (bus-powered) device, thereby requesting a current necessary for the relevant components to operate only on the power supplied from the host device 5 to the Bp device.

That is, although designed to be an Sp (self-powered) device under the USB standard, the terminal apparatus 1 may notify the host device 5 that it is a Bp device in order to request VBUS currents of up to 500 mA from the host.

When the current of only up to 100 mA can be acquired from the host device according to the USB standard, as is the case immediately after power-up, the terminal apparatus 1 is configured to operate on the power from the battery 2. This makes it possible for the terminal apparatus 1 to operate at the current of only up to 100 mA available from the host device 5 without furnishing an additional control unit operating at the current of up to 100 mA.

Furthermore, when the current necessary for operating the relevant components of the terminal apparatus 1 is requested of and made available from the host device 5, the terminal apparatus 1 can operate on the power derived from the host device 5 alone. This minimizes the amount of the power being dissipated from the battery 2. That in turn makes it possible for the terminal apparatus 1 to circumvent the situation in which the power falls short during communication with the host device 5. Thus, although structured simply, the terminal apparatus 1 can communicate reliably with the host device 5 from which power is supplied.

Also, if the current necessary for operating the relevant components is not available from the host device 5 upon elapse of a predetermined time period after the request for the necessary current was made, then the control section 4 causes a display section 6 to display a screen (not shown) on which to select whether or not to acquire from the host device 5 the current necessary for operating the relevant components.

If the current necessary for operating the relevant components is selected to be acquired from the host device 5 by operations made on the above-mentioned screen, the control section 4 waits continuously for the necessary current to be supplied by the host device 5.

If the necessary current is not selected to be acquired, then the control section 4 notifies the host device 5 that the terminal apparatus 1 is an Sp device, in order to request the host device 5 to supply the current commensurate with the Sp device.

In addition to the above structures, the terminal apparatus 1 may include a remaining battery level detecting section 7 for detecting the remaining level of the battery 2. If the remaining battery level detected by the remaining battery level detecting section 7 is lower than a predetermined level, the control section 4 notifies the host device 5 that the terminal apparatus 1 is a Bp device and requests the host device 5 to supply the current necessary for operating the relevant components of the terminal.

If the remaining battery level detected by the remaining battery level detecting section 7 is equal to or higher than the predetermined level, then the control section 4 notifies the host device 5 that the terminal apparatus 1 is an Sp device and requests the host device 5 to supply the current commensurate with the Sp device.

A specific example of the terminal apparatus 1 structured as described above will now be explained below in detail.

1-2. Specific Example of the First Embodiment

[1-2-1. External Structure of the Digital Still Camera]

Figure 2A:
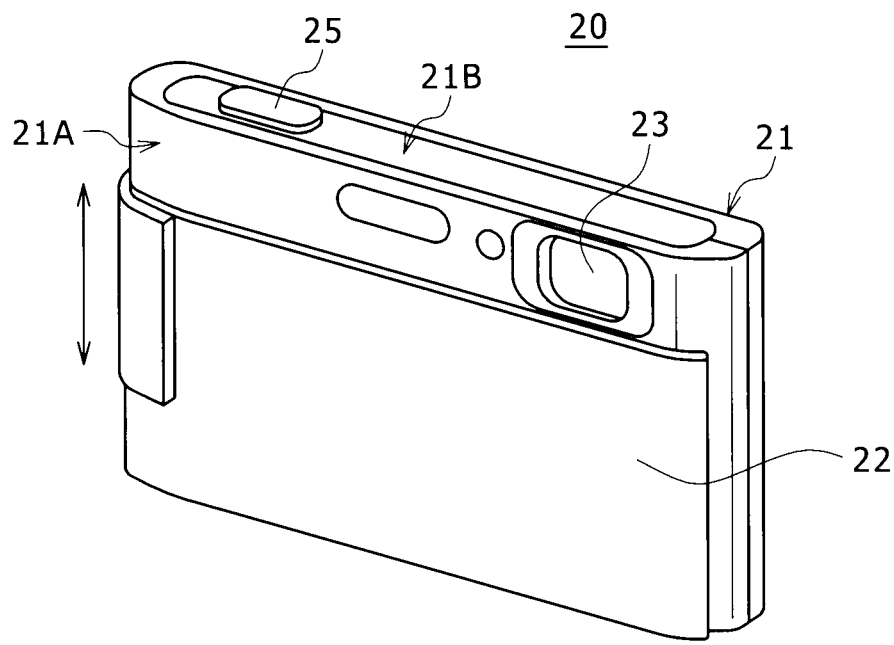
FIGS. 2A and 2B are schematic views showing an external structure (part 1) of a digital still camera (DSC) as a specific example of the first embodiment.
Figure 2B:
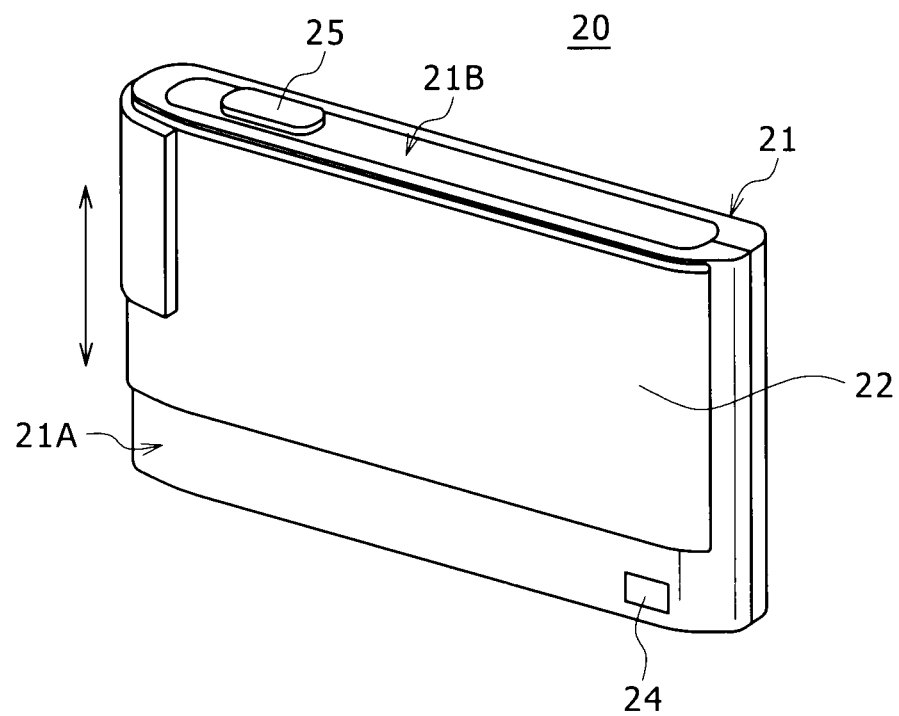
Figure 3:
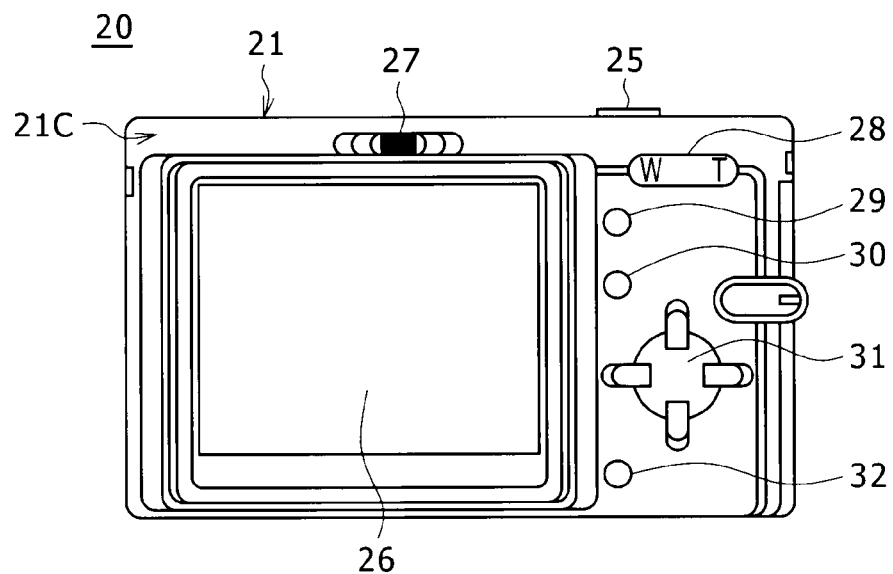
FIG. 3 is a schematic view showing an external structure (part 2) of the digital still camera (DSC)

Explained below in reference to FIGS. 2A, 2B and 3 is an external structure of a digital still camera (called the DSC) 20 as a specific example of the above-described terminal apparatus 1.

The DSC 20 has a flat, rectangular-shaped enclosure 21. The front 21A of the enclosure 21 is covered with a slide cover 22 that slides up and down. The front 21A is provided, at its upper position, with a lens 23 that is exposed when the slide cover 22 is slid downward for a predetermined distance. The front 21A is also provided, at its lower position, with a USB connector 24 that is exposed when the slide cover 22 is slid upward for a predetermined distance.

The state in which the lens 23 is exposed by sliding the slide cover 22 downward for the predetermined distance is called the opened state. The state in which the lens 23 is covered by the slide cover 22 slid upward for the predetermined distance is called the closed state.

The top 21B of the enclosure 21 is provided with a shutter button 25. The back 21C (FIG. 3) of the enclosure 21 is furnished with a liquid crystal display (LCD) 26, a mode changeover switch 27, a zoom button 28, a USB connection setting button 29, a VBUS power use setting button 30, arrow keys 31, and an enter button 32.

The USB connection setting button 29 is used to get a USB connection setting screen (to be discussed later) displayed on the LCD 26. The VBUS power use setting button 30 is used to get a VBUS connection setting screen (to be discussed later) displayed on the LCD 26. Alternatively, there may be provided a touch-sensitive panel, not shown, that will allow the operations of the mode changeover switch 27, zoom button 28, USB connection setting button 29, VBUS power use setting button 30, arrow keys 31, and enter button 32 to be carried out.

The DSC 20 is turned on when placed into the open state. The DSC 20 operates in picture-taking mode or in reproduction mode depending on the operation of the mode changeover switch 27.

In picture-taking mode, the DSC 20 causes the LCD 26 to display a picture of the object being imaged through the lens 23. When the zoom button 28 is pressed, the DSC 20 performs zooming accordingly. When the shutter button 25 is pressed, the DSC 20 records in response the picture of the object being imaged.

In reproduction mode, the DSC 20 causes the LCD 26 to display recorded pictures. When the arrow keys 31 and enter button 32 are pressed, the DSC 20 switches the pictures displayed on the LCD 26 accordingly.

Figure 4:
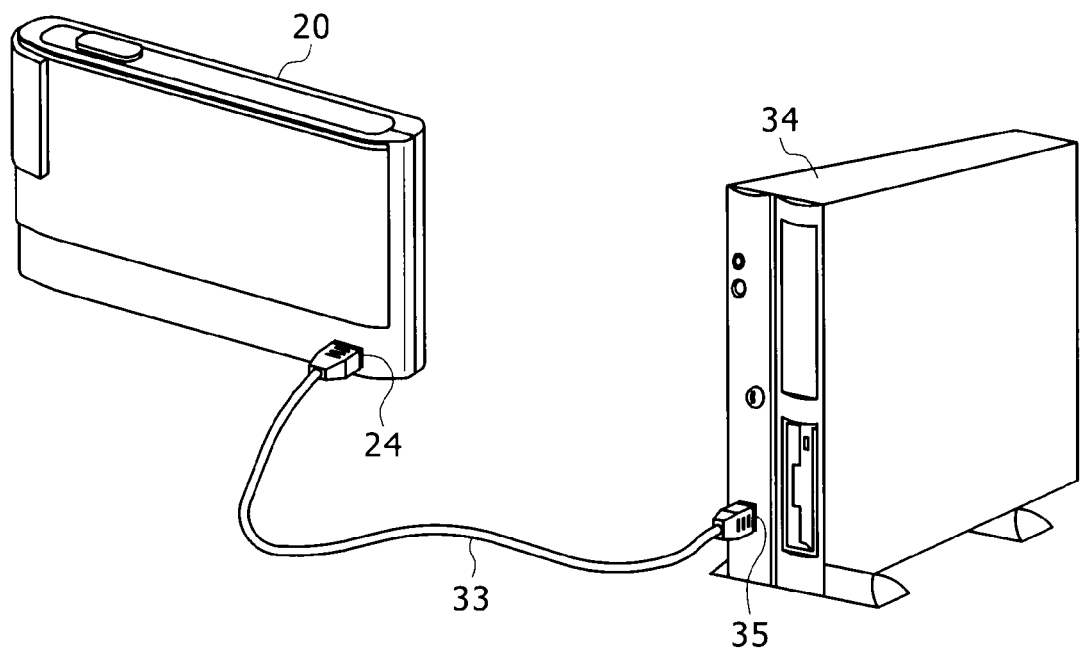
FIG. 4 is a schematic view showing how the digital still camera (DSC) is connected with a personal computer (PC)

When one end of a USB cable 33 is inserted into the USB connector 24 exposed in the closed state as shown in FIG. 4, the DSC 20 is connected with a personal computer (called the PC) 34 via the USE cable 33. It is assumed that the other end of the USB cable 33 is inserted into a USB connector 35 of the PC 34. This connection allows the DSC 20 to communicate with the PC 34 as the host device.

[1-2-2. Hardware Structure of the Digital Still Camera (DSC)]

Figure 5:
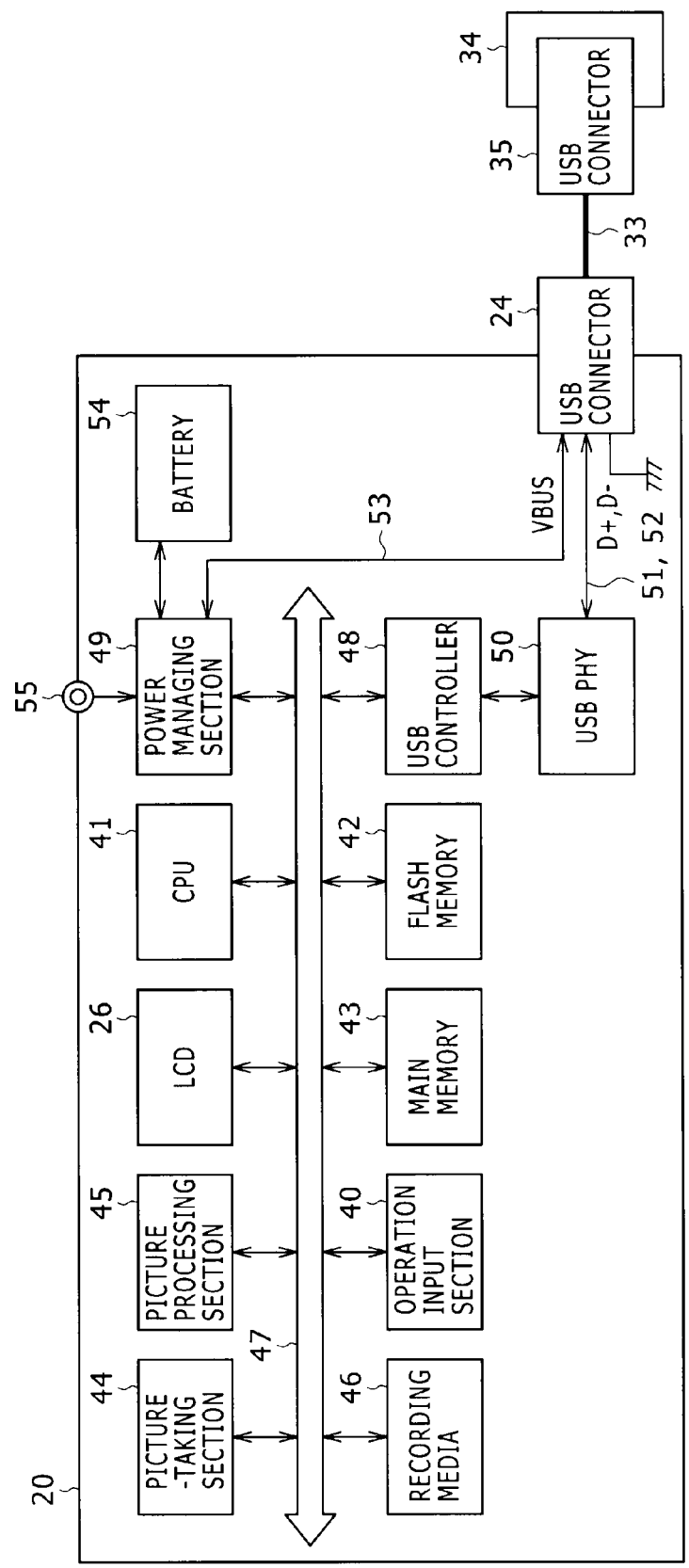
FIG. 5 is a block diagram showing an internal structure (hardware structure) of the digital still camera (DSC)

Described below in reference to FIG. 5 is a hardware structure of the DSC 20. The DSC 20 has the LCD 26, an operation input section 40, a CPU (central processing unit) 41, a flash memory 42, a main memory 43, a picture-taking section 44, a picture processing section 45, and recording media 46 all connected to a bus 47.

The operation input section 40 is made up of the above-mentioned shutter button 25, mode changeover switch 27, zoom button 28, USB connection setting button 29, VBUS power use setting button 30, arrow keys 31, and enter button 32.

The bus 47 is further connected with a USB controller 48 and a power managing section 49. The USB controller 48 is connected to a USB physical layer (PHY) 50. The USB PHY 50 is connected to a D+ signal line 51 and a D− signal line 52 coming from the USB connector 24. The power managing section 49 is connected with a VBUS signal line (also simply called the VBUS) 53 coming from the USB connector 24, a battery 54, and an external power source 55.

The D+ signal line 51 and D− signal line 52 serve as the signal lines for data transmission and reception. The VBUS 53 serves as the signal line for detecting the connection with a host device (PC 34 in this setup) as well as for ensuring the supply of power from the host device (PC 34). These signal lines are connected to their counterparts on the side of the PC 34 when the USB cable 33 is inserted into the USB connector 24 of the DSC 20 and into the USB connector 35 of the PC 34. The external power source 55 is illustratively an AC adapter or an external battery that may be attached as needed by the user.

Incidentally, the battery 54 of the DSC 20 is a hardware component corresponding to the battery 2 of the terminal apparatus 1. The USB controller 48, USB PHY 50, and USB connector 24 of the DSC 20 are hardware components corresponding to the USB port 3 of the terminal apparatus 1. Also, the CPU 41 of the DSC 20 is a hardware component corresponding to the control section 4 and remaining battery level detecting section 7 of the terminal apparatus 1.

In the DSC 20, the power managing section 49 supplies relevant components with necessary power that is drawn from the battery 54, from the PC 34, or from the external power source 55. Also in the DSC 20, the CPU 41 loads programs from the flash memory 42 into the main memory 43 for execution, thereby controlling the relevant components and carrying out diverse processing.

Suppose that the DSC 20 is being carried around by the user so that neither the external power source 55 nor the PC 34 is connected to the DSC 20. In such a case, the DSC 20 operates only on the power obtained from the battery 54. More specifically, the power managing section 49 supplies the relevant components with the necessary power drawn from the battery 54.

If the operation input section 40 is operated at this point for switchover to picture-taking mode, the CPU 41 of the DSC 20 goes into picture-taking mode. Then under control of the CPU 41, the picture-taking section 44 converts the light from the object being admitted through the above-mentioned lens 23 into an electrical signal using image sensors (i.e., in photoelectric conversion). The analog picture signal thus obtained is forwarded to the picture processing section 45.

The picture processing section 45 subjects the analog picture signal coming from the picture-taking section 44 to analog-to-digital conversion so as to obtain a digital picture signal. The picture processing section 45 further performs predetermined picture processing on the digital picture signal, before forwarding the processed signal to the LCD 26. Given the signal, the LCD 26 displays a picture of the imaged object.

In the manner outlined above, the DSC 20 allows the user to verify the object being imaged. With the object found to be displayed as desired, the user may then press the shutter button 25.

In response, the picture processing section 45 under control of the CPU 41 compresses the digital picture signal using a predetermined companding format to create a compressed digital picture signal (also called the compressed picture data). The companding format to be adopted may illustratively be the JPEG (Joint Photographic Experts Group) format.

The CPU 41 writes to the main memory 43 the compressed picture data created by the picture processing section 45. Then the CPU 41 records the data to the recording media 46. In this manner, the DSC 20 gets the picture of the object recorded (i.e., picture of the object taken).

When changeover to reproduction mode is effected through the operation input section 40, the CPU 41 goes into reproduction mode. Then the CPU 41 loads the compressed picture data from the recording media 46 into the main memory 43, before forwarding the data to the picture processing section 45.

Under control of the CPU 41, the picture processing section 45 expands the forwarded compressed picture data back into the original digital picture signal using the same companding format as that used upon data compression, performs predetermined picture processing on the digital picture signal, and forwards the processed signal to the LCD 26. As a result, the LCD 26 displays the recorded picture. This is how the DSC 20 displays recorded pictures (i.e., pictures taken).

The CPU 41 loads into the main memory 43 the data for use as GUI (graphical user interface) screens such as icons, buttons and menus from the flash memory 42. The CPU 41 proceeds to send the loaded data to the picture processing section 45.

Based on the received data for GUI screen use, the picture processing section 45 creates GUI screen data and forwards the data to the LCD 26. In turn, the LCD 26 displays various GUI screens. This is how the DSC 20 displays diverse GUI screens.

Suppose now that the DSC 20 is connected to the PC 34 by way of the USB cable 33. In this case, if the external power source 55 is not connected, the DSC 20 operates on the power from the battery 54 or from the PC 34.

That is, if the power available from the PC 34 through the VBUS 53 is sufficient for operating the relevant components, the power managing section 49 feeds the power (i.e., power from the PC 34) to the relevant components. If the power coming from the PC 34 is insufficient for operating the relevant components, then the power managing section 49 acquires the necessary power from the battery 54 and feeds the acquired power to the components.

The DSC 20 is designed to operate on the power of 5 V, 500 mA. When this power is made available from the PC 34, the DSC 20 can operate on the power from the PC 34 alone.

As described above, the power managing section 49 switches the power source from the VBUS 53 (i.e., PC 34) to the battery 54 or vice versa as needed in order to supply the necessary power to the relevant components. The timing for switching the power source will be discussed later.

In the above setup (i.e., where the DSC 20 is connected with the PC 34), the signal level of the VBUS signal passing through the VBUS 53 becomes High. The CPU 41 detects the High signal level by way of the power managing section 49 and thereby recognizes that the connection is established with the PC 34.

Thereafter, the CPU 41 starts communicating with the PC 34 by controlling data exchanges therewith using the USB PHY 50 under the USB protocol in collaboration with the USB controller 48.

That is, the CPU 41 first forwards the data to be transmitted to the PC 34 to the USB PHY 50 via the USB controller 48. In turn, the USB PHY 50 subjects the forwarded data to a digital-to-analog conversion process for conversion into the format suitable for USB transmission and reception. The suitably formatted data is forwarded to the USB connector 24 over the D+ signal line 51 and D− signal line 52. As a result, the data is transmitted from the USB connector 24 to the PC 34 through the USB cable 33.

Meanwhile, the data transmitted from the PC 34 via the USB cable 33 is received by the USB connector 24 and forwarded to the USB PHY 50 through the D+ signal line 51 and D− signal line 52. The USB PHY 50 subjects the forwarded data to an analog-to-digital conversion process for conversion into the format compatible with the CPU 41, before sending the suitably formatted data to the CPU 41. This is how the DSC 20 communicates with the connected PC 34.

If the external power source 55 is connected to the DSC 20, the DSC 20 can operate on the power either from the external power source 55 or from the PC 34. That is, the power managing section 49 may replace the battery 54 with the external power source 55 from which to draw power. In this case, the power managing section 49 supplies and recharges the battery 54 with the power available from the external power source 55 or from the PC 34 in a manner guaranteeing normal performance of the relevant components.

As opposed to the DSC 20 described above, the PC 34 acting as the host device is a common information processing apparatus equipped with USB host capabilities. Thus detailed hardware structures of the PC 34 will not be discussed below.

Instead, a brief explanation of the PC 34 is given herein. The PC 34 illustratively includes a CPU, a ROM (read only memory), a RAM (random access memory), a hard disk drive, a display, and an operation input section (none shown) as hardware for information processing purposes. The PC 34 further includes a USB controller and a USB PHY (neither shown) compatible with the USB host capabilities, as well as the USB connector 35.

In the PC 34, the CPU loads programs such as the OS (operating system) from the ROM or hard disk drive into the RAM for execution, thereby controlling the relevant components and carrying out diverse processing. When connected to the DSC 20 through the USB cable 33, the PC 34 recognizes the DSC 20 on a plug-and-play basis and communicates with, and supplies power to, the DSC 20.

That is, the PC 34 transmits data and supplies power simultaneously to the DSC 20 through the USB connector 35 and over the USB cable 33. Also, the PC 34 receives data transmitted from the DSC 20 over the USB cable 33 and through the USB connector 35. The received data is forwarded illustratively to the CPU for predetermined arithmetic processing.

As mentioned earlier, when connected with the PC 34, the DSC 20 switches the power source from the VBUS 53 (i.e., PC 34) to the battery 54 or vice versa as needed for operation. The timing for switching the power source will be discussed below in detail in conjunction with a connection starting sequence (also called the connecting sequence) between the DSC 20 and the PC 34.

[1-2-3. Connecting Sequence]

Figure 6:
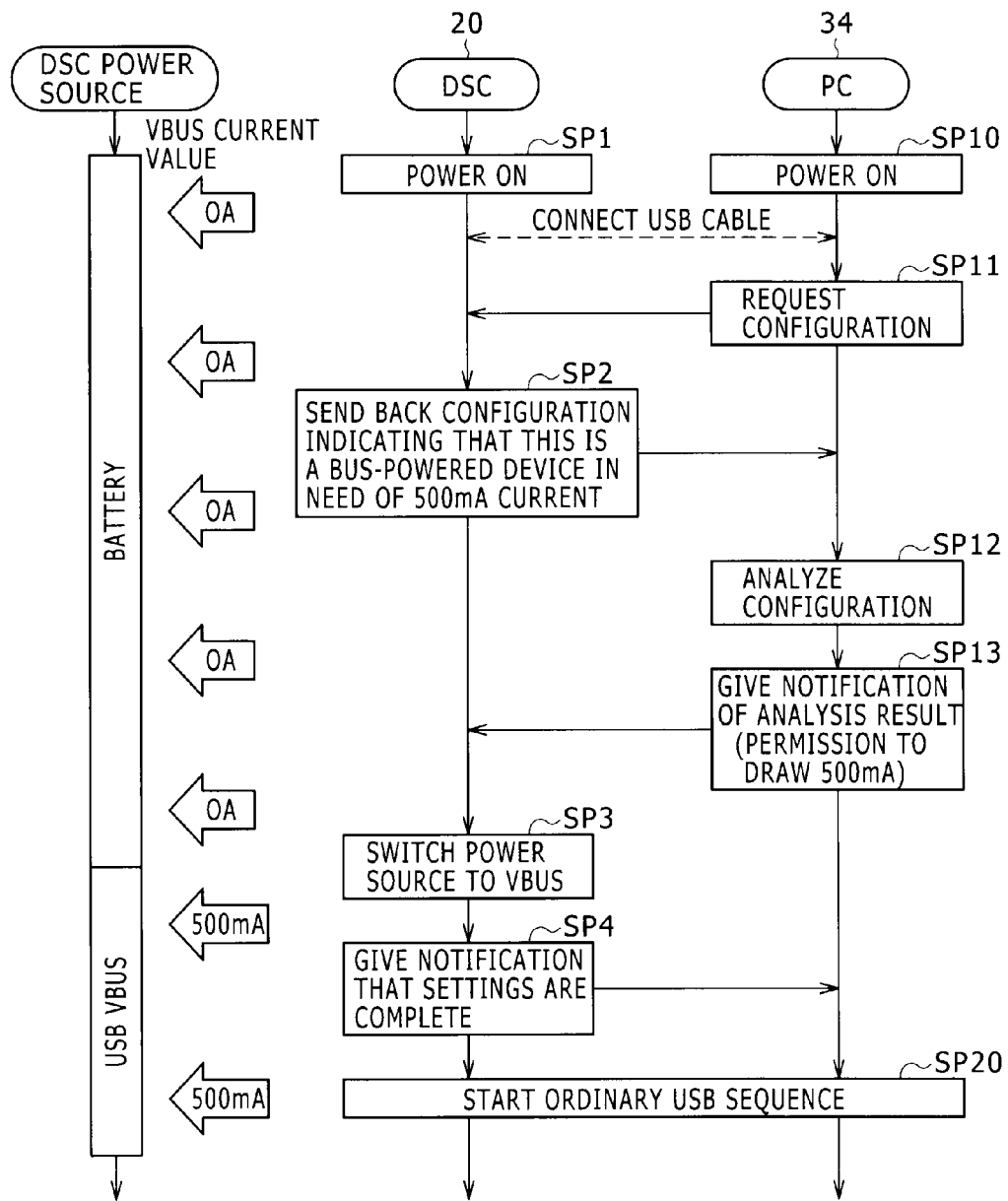
FIG. 6 is a sequence chart showing a connecting sequence between the DSC as the first embodiment and the PC.

FIG. 6 shows a typical connecting sequence between the DSC 20 and the PC 34. This connecting sequence is primarily made up of steps performed by the CPU 41 of the DSC 20 and by the CPU of the PC 34.

In step SP1, the DSC 20 is turned on illustratively by the user's operation. At this point, the power managing section 49 of the DSC 20 selects the battery 54 as the power source and supplies the relevant components with the necessary power acquired from the battery 54.

In step SP10, the PC 34 is turned on. At this point, no connection has yet to be established between the DSC 20 and the PC 34.

Thereafter, inserting the USB cable 33 into the USB connector 24 of the DSC 20 and into the USB connector 35 of the PC 34 connects the DSC 20 with the PC 34. From this time on, the DSC 20 can draw currents of up to 100 mA from the PC 34.

In step SP11, the PC 34 issues several communication commands called requests to the DSC 20 so as to determine what type of terminal apparatus the DSC 20 is. One of the communication commands is "Get_Descriptor" that is issued by the PC 34 to request a configuration descriptor from the DSC 20.

The configuration descriptor is a data set that describes various settings of the terminal apparatus (DSC 20 in this case). In reality, as shown in FIG. 7, the diverse settings of the configuration descriptor are written in their corresponding fields in predetermined sizes.

For example, as shown in FIG. 8, the "bmAttributes" field contains one-byte settings that indicate whether the terminal apparatus is an Sp (self-powered) device or a BP (bus-powered) device, and other specifics. Illustratively, if the terminal apparatus is a Bp device, a "0" is set to bit 6 in the field; if the terminal apparatus is an Sp device, then a "1" is set to bit 6.

The "MaxPower" field, as shown in FIG. 9, contains one-byte settings that indicate half the maximum current (mA) coming from the VBUS (also called the VBUS current) and needed by the terminal apparatus. Illustratively, if the maximum VBUS current needed by the terminal apparatus is 100 mA, then "0x32" is set in the field; if the maximum VBUS current required by the terminal apparatus is 500 mA, then "0xFA" is set in the field.

The PC 34 requests the configuration descriptor explained above from the DSC 20. Upon receipt of the request, the CPU 41 of the DSC 20 goes to step SP2 and sends back to the PC 34 the configuration descriptor saying that the DSC 20 is a Bp device and that the maximum VBUS current required is 500 mA.

That is, the CPU 41 sets a "0" to bit 6 in the "bmAttributes" field and "0xFA" in the "MaxPower" field of the configuration descriptor, before transmitting the configuration descriptor to the PC 34.

As described, although classified as an Sp device (i.e., battery-powered device) under the USB standard, the DSC 20 notifies the PC 34 that it is a Bp device and thereby requests from the PC 34 the VBUS current of 500 mA commensurate with the Bp device. The request is made so that the DSC 20 may operate only on the power derived from the PC 34.

Upon receipt of the configuration descriptor from the DSC 20, the PC 34 goes to step SP12 and analyzes the received configuration descriptor to determine whether the DSC 20 is a device that may be authorized for connection. At the same time, it is also determined whether the requested VBUS current can be supplied.

In effect, the configuration descriptor sent from the DSC 20 indicates that the DSC 20 is a Bp device and that the maximum VBUS current required by the DSC 20 is 500 mA. So the PC 34 determines whether or not the DSC 20 is allowed to be connected as a Bp device requesting the VBUS current of 500 mA. It should be noted here that it is not according to the USB standard that the battery-powered DSC 20 declares itself a Bp device.

However, since the start of the connection up to the present, the PC 34 can only recognize that the DSC 20 is a device capable of operating at currents of up to 100 mA. That is, it is impossible for the PC 34 to determine whether the DSC 20 is a device operable only at the VBUS current or a device driven by its own battery.

For that reason, even after declaring itself a Bp device, the battery-powered DSC 20 is not perceived as an aberrant device having falsely declared itself in violation of the USB standard.

A Bp device requesting the VBUS current of 500 mA is in compliance with the USB standard. Even when making that request, the DSC 20 is not recognized by the PC 34 as an errant device going against the USB standard.

That is, the PC recognizes that the DSC 20 requesting the 500 mA VBUS current as a Bp device is a legitimate device in compliance with the USB standard. The PC 34 proceeds to recognize that the DSC 20 is allowed to be connected, whereby the DSC 20 is authenticated by the PC 34.

After analyzing the configuration descriptor and determining that the DSC 20 is allowed to be connected as described above, the PC 34 goes to step SP13. In step SP13, the PC 34 notifies the DSC 20 of the result from analyzing the configuration descriptor. That is, the PC 34 authorizes the DSC 20 to establish connection based on the contents of the received configuration descriptor.

More specifically, by issuing "Set_Configuration" as one of the requests, the PC 34 permits the DSC 20 to make the connection on the basis of the received configuration descriptor. This is how the DSC 20 is authorized to draw the current of 500 mA from the PC 34.

When thus authorized by the PC 34 to establish connection based on the contents of the configuration descriptor, the CPU 41 of the DSC 20 goes to step SP3 and orders the power managing section 49 to switch the power source from the battery 54 to the VBUS 53.

Since utilization of the VBUS current of 500 mA is already authorized by the PC 34, the power managing section 49 acquires the power of 5 V, 500 mA from the VBUS 53 and supplies the relevant components therewith. As a result, the DSC 20 operates on the power only from the VBUS 53, i.e., from the PC 34.

The CPU 41 of the DSC 20 then goes to step SP4. In step SP4, the CPU 41 notifies the PC 34 that the settings such as the switching of the power source are now complete.

Thereafter, the CPU 41 of the DSC 20 and the PC 34 both go to step SP20 and start the ordinary USB sequence in collaboration. The connecting sequence above connects the DSC 20 with the PC 34 and allows the DSC 20 to switch the power source from the battery 54 to the VBUS 53.

As explained above, when initially connected with the PC 34 through the USB port, the DSC 20 operates on the power from the battery 54 because the necessary power has yet to be acquired from the PC 34 at this point. After declaring itself a Bp device to the PC 34, the DSC 20 requests the PC 34 to provide the VBUS current of 500 mA that is needed for operation.

At this point, the PC 34 cannot determine whether or not the DSC 20 is an Sp device. Thus the DSC 20 is authenticated as a USB-compliant device by the PC 34 and allowed to draw the VBUS current of 500 mA from the latter.

When authenticated by the PC 34, the DSC 20 switches the power source from the battery 54 to the VBUS 53 and draws the 500 mA VBUS current from the PC 34. The DSC 20 thus operates on the power (5 V, 500 mA) from the VBUS 53 alone.

As described, the DSC 20 can draw from the PC 34 the VBUS current of up to 500 mA allowed for utilization by a Bp device, without letting the PC 34 recognize that the DSC 20 declared itself to be not an Sp device but a Bp device in violation of the USB standard.

Also, while waiting to be authenticated by the PC (i.e., while the 500 mA current necessary for operation has yet to be made available from the PC 34), the DSC 20 operates from the battery 54. That means there is no need for a separately provided control unit operating at a small current. The DSC 20 can thus be simply structured.

The DSC 20 operates from the battery 54 only while waiting to be authenticated by the PC 34; after authentication, the DSC 20 can operate on the power from the PC 34. For this reason, it is possible for the DSC 20 to minimize the power dissipation of the battery 54. This makes it possible for the DSC 20 to circumvent the situation in which the power from the battery 54 falls short during communication with the PC 34.

Furthermore, the above-described switching of the power source by the DSC 20 can not only be performed in the initial phase of the connection of the DSC 20 with the PC 34 but also be utilized effectively upon changeover of the PC 34 from normal mode to suspend mode, the latter being a power-saving mode.

[1-2-4. Suspend Sequence]

Figure 10:
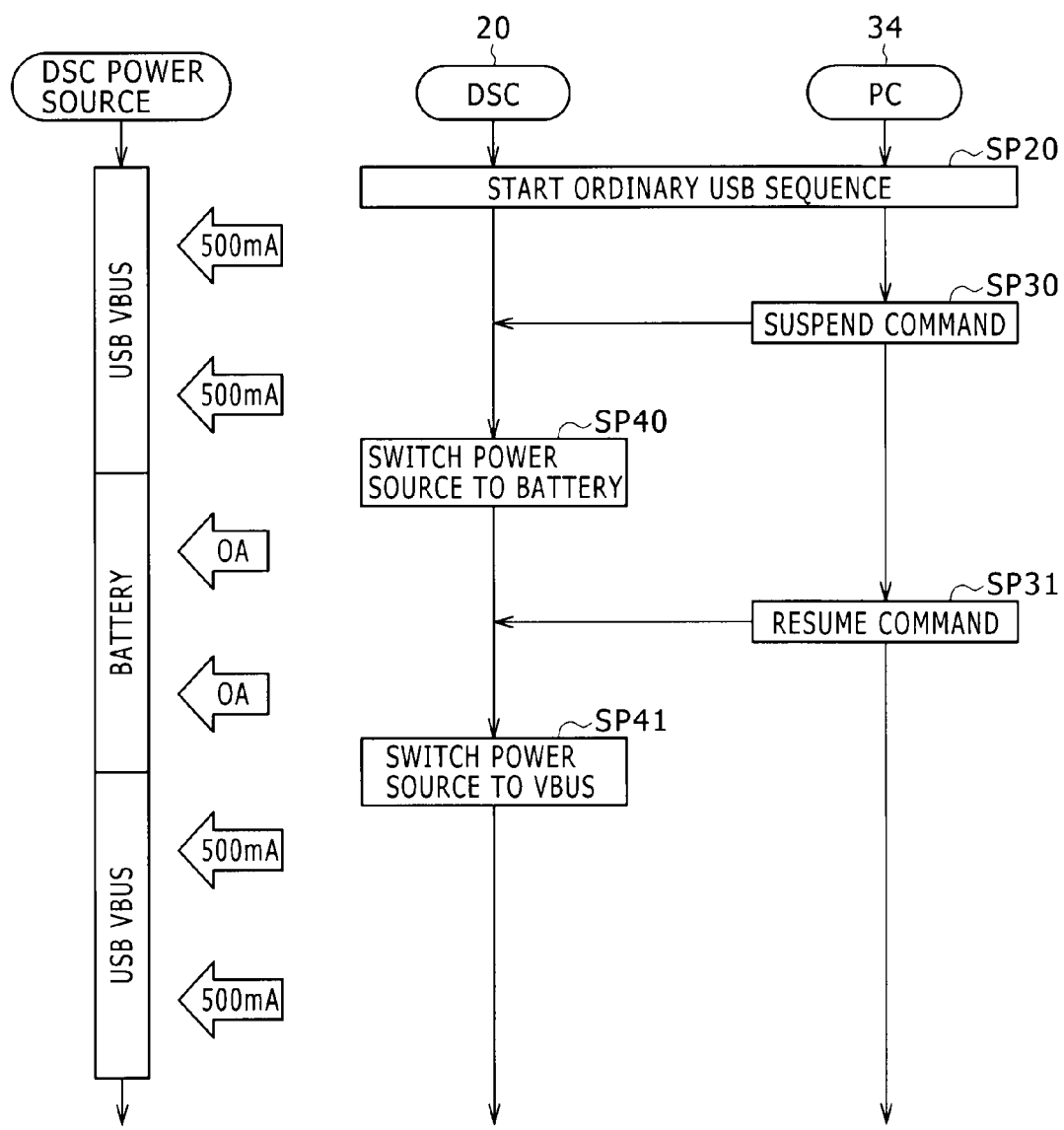
FIG. 10 is a sequence chart showing a suspend sequence between the DSC as the first embodiment and the PC.

FIG. 10 shows a typical sequence at suspend time (also called the suspend sequence). The suspend sequence is also made up of steps carried out primarily by the CPU 41 of the DSC 20 and by the CPU of the PC 34.

In step SP20, as described above, the CPU 41 of the DSC 20 and the PC 34 are assumed to have started the ordinary USB sequence in collaboration. At this point, the DSC 20 operates only on the power from the VBUS 53 (5 V, 500 mA) as mentioned above.

Later, the PC 34 is assumed to go into suspend mode. At this point, the PC 34 in step SP30 transmits a suspend signal to the DSC 20 ordering the DSC 20 to go into suspend mode as well.

According to the USB standard, when the host device is in suspend mode, the connected terminal apparatus must not draw VBUS currents in excess of 2.5 mA from the host device. Therefore, on receiving the suspend signal, the Bp device usually goes into suspend mode as well operating at the VBUS current of 2.5 mA.

However, the DSC 20 cannot enter suspend mode because it does not have a control unit operating at the VBUS current of 2.5 mA. If an attempt is made to operate at the 2.5 mA VBUS current, the DSC 20 will be turned off because of a lack of power.

Thus upon receipt of the suspend signal from the PC 34, the CPU 41 of the DSC 20 goes to step SP40 and orders the power managing section 49 to switch the power source from the VBUS 53 to the battery 54. This allows the DSC 20 to remain active without being cut off from power while the PC 34 is in suspend mode.

At this point, the PC 34 does not recognize that the DSC 20 has switched to being driven by its own battery. Instead, the PC 34 recognizes that the DSC 20 has entered suspend mode operating at VBUS currents of up to 2.5 mA according to the USB standard.

Later, the PC 34 is assumed to return from suspend mode to normal mode (this operation is called a resume). At this point, the PC 34 in step SP31 transmits a resume signal to the DSC 20 ordering the DSC 20 to resume its operation as well.

On receiving the resume signal from the PC 34, the CPU 41 of the DSC 20 goes to step SP41 and orders the power managing section 49 to switch the power source from the battery 54 to the VBUS 53. This enables the DSC 20 to again operate only on the power from the VBUS 53 (5 V, 500 mA). At this point, the PC 34 recognizes that the DSC 20 has resumed its operation according to the USB standard.

The suspend sequence above allows the DSC 20 to switch the power source from the VBUS 53 to the battery 54 when the PC 34 goes into suspend mode. With the PC 34 having entered suspend mode, the DSC 20 switches the power source from the VBUS 53 to the battery 54, thereby circumventing the situation in which the DSC 20 is turned off because of a lack of the necessary power.

In effect, once turned off, the DSC 20 cannot turn itself on automatically. That is, when switched off with the PC 34 in suspend mode, the DSC 20 remains off even after the PC 34 resumes its operation and therefore cannot communicate with the latter.

Since the DSC 20 is not turned off and keeps operating when the PC 34 goes into suspend mode, the DSC 20 can start communicating with the PC 34 immediately after the PC 34 resumes its operation.

The DSC 20 operates on the power from the battery 54 while the PC 34 is in suspend mode. This means that there is no need for the DSC 20 to adopt a separate control block for remaining active in suspend mode when the PC 34 goes into suspend mode. As a result, the DSC 20 can be implemented in a simplified structure.

[1-2-5. Operation and Effects]

In the above-described structure, the DSC 20 is designed to operate on the power of 5 V, 500 mA. This power is acquired either from the battery 54 or from the PC 34 connected through the USB port.

When connected to the PC 34 via the USB port, the DSC 20 operating from the battery 54 requests the VBUS current of 500 mA from the PC 34 by notifying the latter that the DSC 20 is a Bp device. The request is made so that the DSC 20 may operate on the power from the PC 34 alone.

At this point, it is impossible for the PC 34 to determine whether the DSC 20 is an Sp device or a Bp device. The PC only determines whether or not the request for the VBUS current of 500 mA from the Bp device is legitimate.

Since the request has been made in compliance with the USB standard, the DSC 20 is authenticated by the PC 34 as a legitimate device. The DSC 20 is thus allowed to draw the VBUS current of 500 mA from the PC 34.

Following authentication by the PC 34, the DSC 20 switches the power source from the battery 54 to the VBUS 53 and draws the VBUS current of 500 mA from the PC 34. From this time on, the DSC 20 operates on the power from the VBUS 53 alone.

As described, the PC 34 authorizes solely the device having notified that it is a Bp device, to draw the VBUS current of up to 500 mA from the PC 34. The notification is given by the DSC 20 to the PC 34. The DSC 20 is then allowed to tap the VBUS current of 500 mA from the PC 34 despite the fact that the DSC 20 is an SP device according to the USB standard.

When unable to obtain from the PC 34 the current of 500 mA necessary for its operation, the DSC 20 operates from the battery. Because there is no need for the DSC 20 to have a separate control unit for operation at currents of less than 500 mA, the DSC 20 can be structured simply.

While waiting to be authenticated by the PC 34, the DSC 20 operates from the battery 54. Following authentication, the DSC 20 operates on the power from the PC 34. This makes it possible for the DSC 20 to minimize the power dissipation of the battery 54. That in turn prevents the battery 54 from going flat while the DSC 20 is communicating with the PC 34.

With the above-described structure in place, the DSC 20, despite being actually an Sp device under the USB standard, can notify the PC 34 that it is a Bp device and thereby request the VBUS current of 500 mA from the PC 34. As a result, the DSC 20 can draw the VBUS current of 500 mA necessary for its operation from the PC 34. Also, the DSC 20 has no need for a separate control unit for operation at currents of less than 500 mA and can thus be structured simply. Furthermore, the DSC 20 is arranged to prevent the battery 54 from going flat during communication with the PC 34. Thus the DSC 20 is simply structured but can communicate reliably with the PC 34 from which power is made available.

2. Second Embodiment

The second embodiment of the present invention is described below. The above-described first embodiment was based on the assumption that the PC 34 is a host device capable of supplying the VBUS current of 500 mA. In reality, however, some PCs 34 are incapable of supplying the VBUS current of 500 mA. Requesting this type of PC 34 to supply the VBUS current of 500 mA fails to secure authorization to draw the current. As a result, the DSC 20 cannot start communicating with the PC 34.

When requesting the PC 34 to provide the VBUS current of 500 mA fails to secure authorization to tap the current, the second embodiment changes the request to circumvent the situation in which communication cannot be started with the PC 34.

Thus what follows is a description of the processing routine performed on the side of the DSC 20 when the DSC 20 and the PC 34 are connected (the routine is also called the connecting routine on the side of the DSC). The structure of the DSC 20 and that of the PC 34 are the same as those of the first embodiment, so that reference to the first embodiment may be made as needed with regard to the structures.

2-1. Connecting Routine on the Side of the DSC

Figure 11:
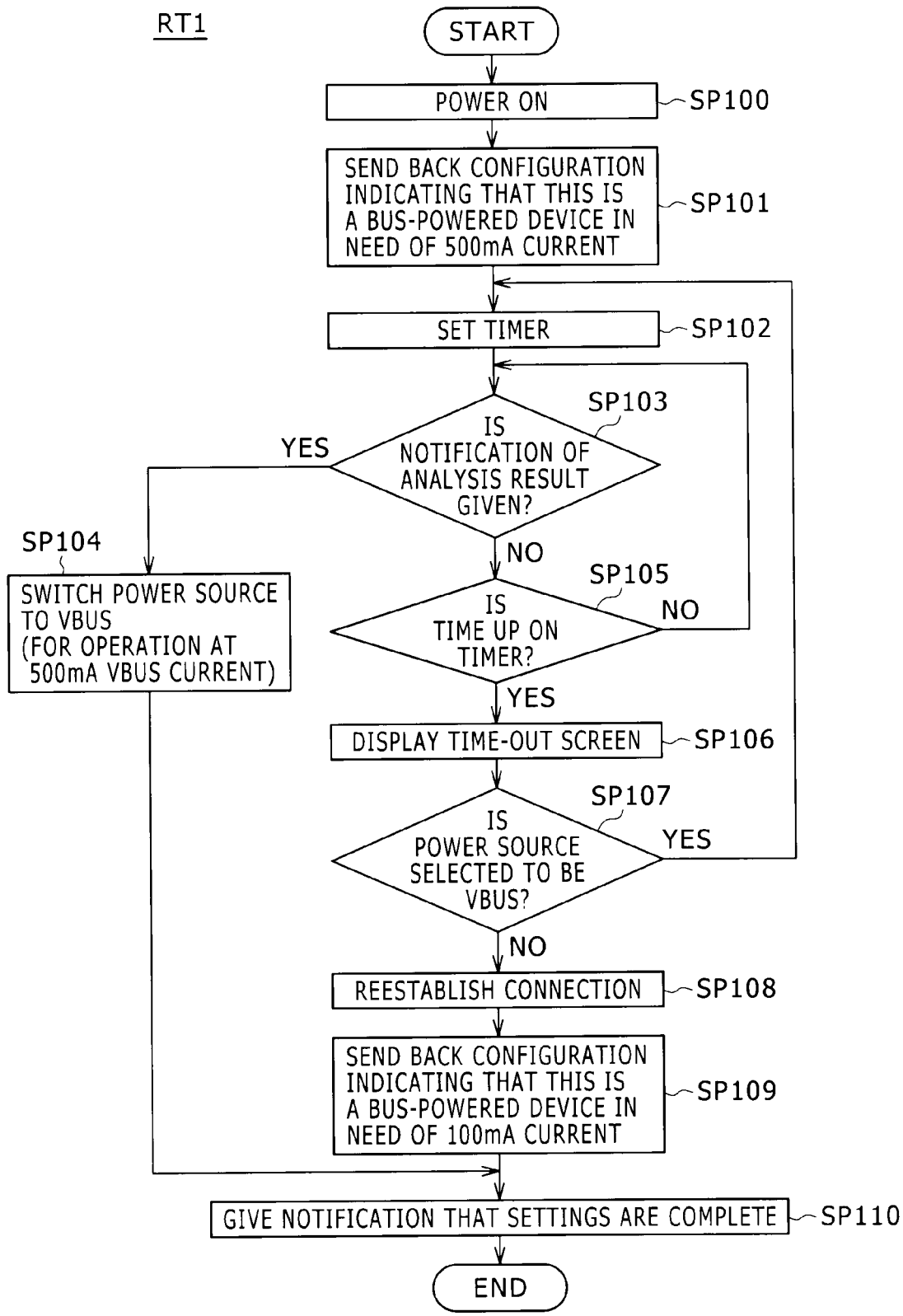
FIG. 11 is a flowchart showing a connecting routine on the side of the DSC as a second embodiment of the present invention.

FIG. 11 shows the connecting routine RT1 on the side of the DSC. The DSC-side connecting routine RT1 is primarily made up of steps carried out by the CPU 41 of the DSC 20.

In step SP100, the DSC 20 is turned on illustratively by the user's operation. At this point, the power managing section 49 of the DSC 20 sets the battery 54 as the power source and supplies the relevant components of the DSC 20 with the power acquired from the battery 54 as necessary for their operations.

At the same time, the PC 34 is assumed to be turned on. Then inserting the USB cable 33 into the USB connector 24 of the DSC 20 and into the USB connector 35 of the PC 34 connects the DSC 20 with the PC 34 on a USB basis.

The PC 34 then issues Get_Descriptor, requesting the DSC 20 to submit its configuration descriptor. Upon receipt of the request, the CPU 41 of the DSC 20 goes to step S101 and sends back to the PC 34 the configuration descriptor indicating that the DSC 20 is a Bp device in need of the VBUS current of up to 500 mA.

The CPU 41 then goes to step SP102 and sets a timer, not shown. After step SP102, the CPU 41 goes to step SP103. The time to be set on the timer is longer (e.g., 5 seconds) than an average time period (measured beforehand) from the time the DSC 20 transmits the configuration descriptor to the PC 34 until the result of the analysis of the descriptor is returned from the PC 34.

In step SP103, the CPU 41 checks to determine whether the result of the analysis of the configuration descriptor sent to the PC 34 is returned from the latter. If the result of the check in step SP103 is affirmative, with the result found to be returned, that means the DSC 20 is authorized to draw the current of 500 mA from the PC 34. At this point, the CPU 41 of the DSC 20 goes to step SP104 and orders the power managing section 49 to switch the power source from the battery 54 to the VBUS 53.

Since the DSC 20 is authorized to tap the VBUS current of 500 mA from the PC 34 by this time, the power managing section 49 acquires the power of 5 V, 500 mA from the VBUS 53 and supplies the relevant components therewith. As a result, the DSC 20 operates on the power from the VBUS 53, i.e., from the PC 34 alone.

The CPU 41 of the DSC 20 then goes to step SP110. In step SP110, the CPU 41 notifies the PC 34 that the settings such as the switchover of the power source are complete, and terminates the connecting routine RT1 on the side of the DSC.

If the result of the check in step SP103 is negative, with the result of the analysis of the configuration descriptor not returned, that means the DSC 20 has yet to be authorized to tap the current of 500 mA from the PC 34. At this point, the CPU 41 of the DSC 20 goes to step SP105. In step SP105, the CPU 41 checks to determine whether the timer has run out (i.e., whether the five-second time period has elapsed).

If the result of the check in step SP105 is negative, that means the timer has yet to run out. In this case, the CPU 41 of the DSC 20 goes back to step SP103.

If the result of the check in step SP105 is affirmative, i.e., if the timer has run out with no result of the analysis returned, that means the DSC 20 is not authorized to draw the VBUS current of 500 mA from the PC 34 within the time set on the timer. In other words, upon elapse of the predetermined time period (e.g., 5 seconds) after the DSC 20 requested the VBUS current of 500 mA from the PC 34, the DSC 20 has yet to be authorized to draw the current from the PC 34.

One reason for the failure above to acquire the power may that the PC 34 is slow to provide authorization. Another reason may be that the PC 34 is a host device incapable of supplying the VBUS current of 500 mA, hence the absence of the authorization.

Figure 12:
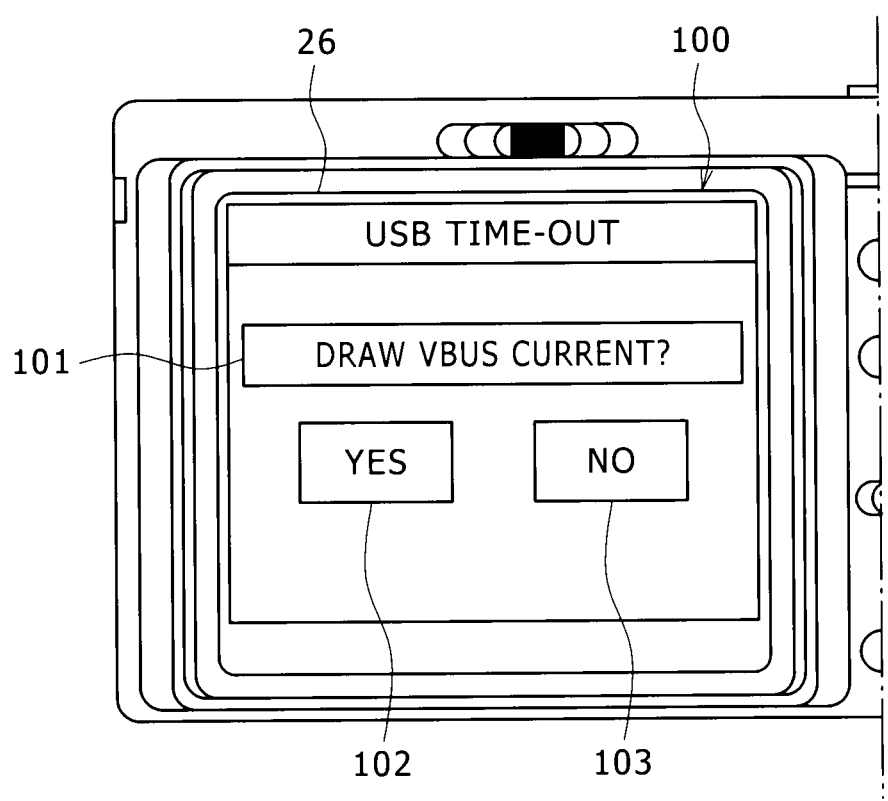
FIG. 12 is a schematic view showing a structure of a time-out screen.

At this point, the CPU 41 of the DSC 20 goes to step SP106. The CPU 41 in step SP106 causes the LCD 26 to display a time-out screen 100 shown in FIG. 12, before going to step SP107. The time-out screen 100 displays a query sentence 101 asking the user whether or not to tap the VBUS current of 500 mA from the PC 34, a YES button 102 for selecting the affirmative answer to the query 101, and a NO button 103 for selecting the negative answer to the query 101.

In step SP107, the CPU 41 checks to determine whether the YES button 102 is pressed on the time-out screen 100 by the user operating the arrow keys 31 and the enter button 32. If the result of the check in step SP107 is affirmative with the YES button 102 pressed, that means the user has chosen to draw the VBUS current of 500 mA from the PC 34. At this point, the CPU 41 returns to step SP102, sets the timer again, and waits for authorization to draw the VBUS current of 500 mA from the PC 34.

If the result of the check in step SP107 is negative with the NO button 103 pressed, that means the user has chosen not to draw the VBUS current of 500 mA from the PC 34. The CPU 41 then goes to step SP108.

In step SP108, the CPU 41 transmits a reset signal to the PC 34 in collaboration with the USB controller 48, thereby performing a reconnecting process with the PC 34. By having the reconnecting process thus carried out, the PC 34 again requests the configuration descriptor.

The CPU 41 of the DSC 20 then goes to step SP109. In step SP109, the CPU 41 sends back to the PC 34 the configuration descriptor saying that the DSC 20 is an Sp device in need of the VBUS current of up to, say, 100 mA.

Although the maximum VBUS current required here is assumed to be 100 mA, this is not limitative of the present invention. Since the Sp device operates from the battery, the maximum necessary VBUS current need not be exactly 100 mA; it may be less than 100 mA.

That is, the CPU 41 first attempts to request the VBUS current of up to 500 mA from the PC 34. When the request is not fulfilled, the CPU 41 gives up the initial request and asks illustratively for the VBUS current of 100 mA that can be supplied more reliably by most host devices.

As a result, the DSC 20 is notified of the result of the analysis of the configuration descriptor and thereby authenticated by the PC 34. Following authentication, the CPU 41 of the DSC 20 goes to step SP110.

By this time, the PC 34 has given permission to tap the VBUS current of only up to 100 mA. Thus the power managing section 49 acquires the power of 5 V, 500 mA from the battery 54 and supplies the relevant components thereof. This enables the DSC 20 to operate on the power from the battery 54.

In step SP110, the CPU 41 of the DSC 20 notifies the PC 34 that the settings are complete, and terminates the connecting routine RT1 on the side of the DSC. This is how the DSC 20 is connected to the PC 34 using the connecting routine RT1.

As described, if the request to draw the VBUS current of up to 500 mA from the PC 34 is not fulfilled by the PC 34 upon elapse of the predetermined time period, then the DSC 20 prompts the user to choose either to wait continuously for permission to draw the same current or to change the request.

If the user chooses to change the request, the DSC 20 performs the reconnecting process with the PC 34. This time, the DSC 20 reduces the maximum VBUS current requested of the PC 34 illustratively to 100 mA. This allows the DSC 20 to circumvent the situation in which communication cannot be started with the PC 34, even if the PC 34 turns out to be a host device incapable of supplying the VBUS current of 500 mA.

3. Third Embodiment

The third embodiment of the present invention is described below. The third embodiment changes the contents of the configuration descriptor to be sent back to the PC 34 in accordance with the remaining battery level of the battery 54.

Thus what follows is a description of the connecting routine performed on the side of the DSC 20 when the DSC 20 and the PC 34 are connected. The structure of the DSC 20 and that of the PC 34 are the same as those of the first embodiment, so that reference to the first embodiment may be made as needed with regard to the structures.

3-1. Connecting Routine on the Side of the DSC

Figure 13:
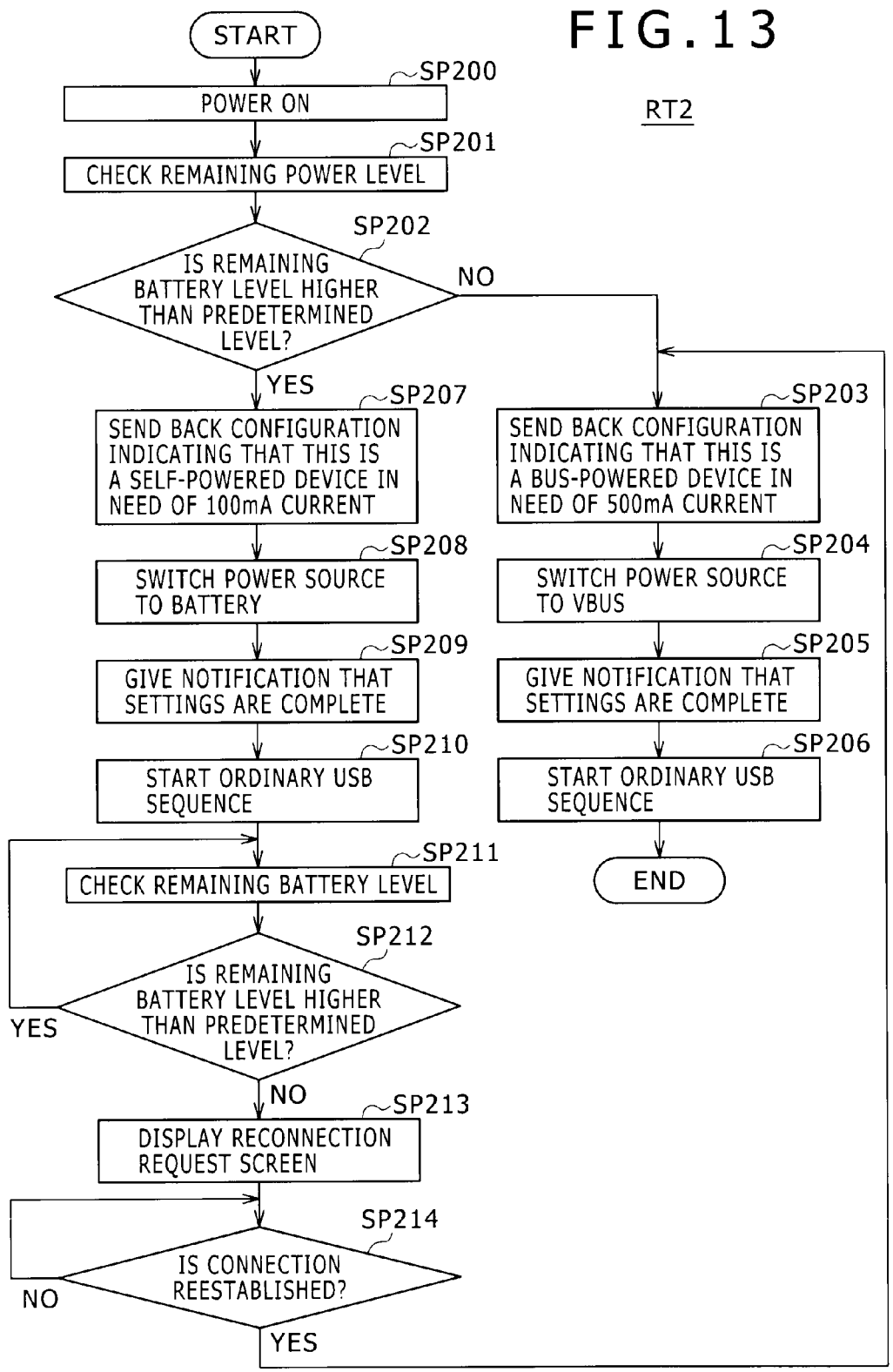
FIG. 13 is a flowchart showing a connecting routine on the side of the DSC as a third embodiment of the present invention.

FIG. 13 shows the connecting routine RT2 on the side of the DSC. The DSC-side connecting routine RT2 is primarily made up of steps carried out by the CPU 41 of the DSC 20.

In step SP200, the DSC 20 is turned on illustratively by the user's operation. At this point, the power managing section 49 of the DSC 20 sets the battery 54 as the power source and supplies the relevant components of the DSC 20 with the power acquired from the battery 54 as necessary for their operations.

At the same time, the PC 34 is assumed to be turned on. Then inserting the USB cable 33 into the USB connector 24 of the DSC 20 and into the USB connector 35 of the PC 34 connects the DSC 20 with the PC 34 on a USB basis.

The PC 34 then issues Get_Descriptor, requesting the DSC 20 to submit its configuration descriptor. Upon receipt of the request, the CPU 41 of the DSC 20 goes to step S201 and checks the remaining battery level of the battery 54 by way of the power managing section 49. After step S201, the CPU 41 goes to step S202.

In step SP202, the CPU 41 checks to determine whether the remaining battery level of the battery 54 is higher than a predetermined level (e.g., 50 percent). If the result of the check in step SP202 is negative, that means the remaining level of the battery 54 is not sufficiently high for communicating with the PC 34.

At this point, the CPU 41 goes to step SP203. In step SP203, the DSC 20 sends back to the PC 34 the configuration descriptor saying that the DSC 20 is a Bp device in need of the VBUS current of up to 500 mA.

Following transmission of the configuration descriptor, the DSC 20 is notified of the result of the analysis of the descriptor and thereby authenticated by the PC 34. The CPU 41 of the DSC 20 then goes to step SP204.

In step SP204, the CPU 41 orders the power managing section 49 to switch the power source to the VBUS 53. After step SP204, the CPU 41 goes to step SP205.

Since the DSC 20 is authorized to tap the VBUS current of 500 mA from the PC 34 by this time, the power managing section 49 acquires the power of 5 V, 500 mA from the VBUS 53 and supplies the relevant components therewith. As a result, the DSC 20 operates on the power from the VBUS 53, i.e., from the PC 34 alone.

In step SP205, the CPU 41 of the DSC 20 notifies the PC 34 that the settings such as the switchover of the power source are complete, before going to step SP206. In step SP206, the CPU 41 starts the ordinary USB sequence in collaboration with the PC 34, thus terminating the connecting routine RT2 on the side of the DSC.

On the other hand, if the result of the check in step SP202 is affirmative, that means the remaining level of the battery 54 is sufficiently high for communicating with the PC 34. At this point, the CPU 41 goes to step SP207 and sends back to the PC 34 the configuration descriptor saying that the DSC 20 is an Sp device in need of the VBUS current of up to, say, 100 mA.

The CPU 41 of the DSC 20 is authenticated by the PC 34 and notified of the result of the analysis of the configuration descriptor. The CPU 41 then goes to step SP208.

In step SP208, the CPU 41 orders the power managing section 49 to switch to the battery 54 if any other power source is currently in effect or to maintain the use of the battery 54 if it is being selected. After step SP208, the CPU 41 goes to step SP209.

By this time, the PC 34 has given permission to tap the VBUS current of only up to 100 mA. Thus the power managing section 49 acquires the power of 5 V, 500 mA from the battery 54 and supplies the relevant components thereof. This enables the DSC 20 to operate on the power from the battery 54.

As described, when the remaining battery level is sufficiently high, the DSC 20 sends to the PC 34 the configuration descriptor saying that the DSC 20 is an Sp device illustratively in need of the VBUS current of up to 100 mA. Only when the remaining battery level is insufficient, does the DSC 20 transmit to the PC 34 the configuration descriptor saying that the DSC 20 is a Bp device in need of the VBUS current of up to 500 mA.

In step SP209, the CPU 41 of the DSC 20 notifies the PC 34 that the settings such as the switchover of the power source are complete, before going to step SP210. In step SP210, the CPU 41 starts the ordinary USB sequence in collaboration with the PC 34, before going to step SP211.

In step SP211, the CPU 41 of the DSC 20 again orders the power managing section 49 to check the remaining battery level of the battery 54. After step SP211, the CPU 41 goes to step SP212.

In step S212, the CPU 41 checks to determine whether the remaining battery level of the battery 54 is higher than the predetermined level (e.g., 50 percent). If the result of the check in step SP212 is affirmative, that means the remaining level of the battery 54 is sufficiently high for communicating with the PC 34. At this point, the CPU 41 goes back to step SP211 and periodically checks the remaining level of the battery 54.

On the other hand, if the result of the check in step SP212 turns out to be negative, that means the remaining battery level of the battery 54 is not sufficiently high for communicating continuously with the PC 34. That is, after sustained communication with the PC 34 in the ordinary USB sequence based on the power tapped from the battery 54, the DSC 20 now finds its remaining battery level to be lower than the predetermined level.

Figure 14:
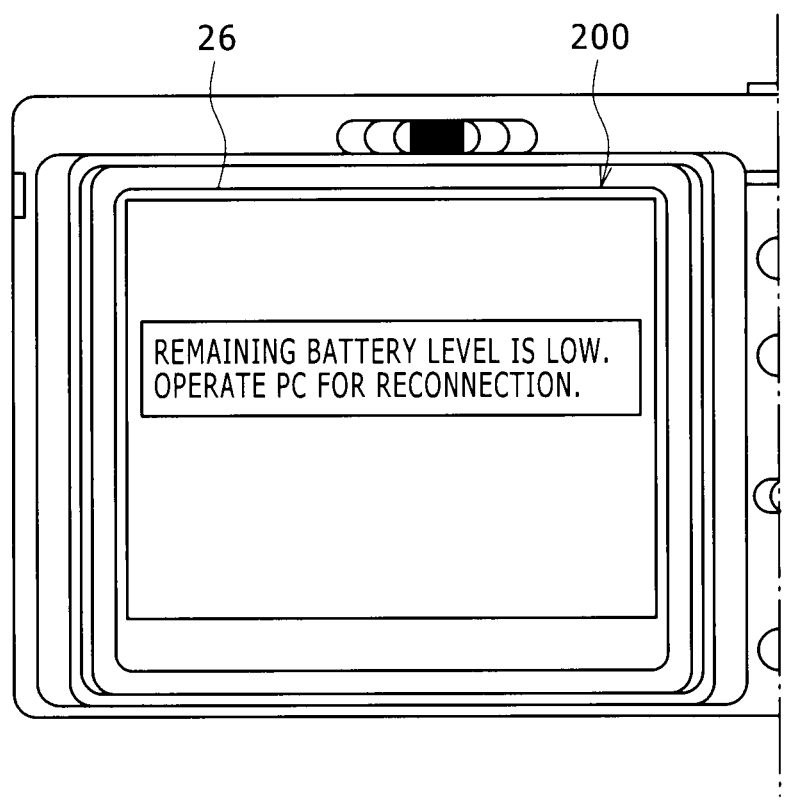
FIG. 14 is a schematic view showing a structure of a reconnection request screen.

At this point, the CPU 41 of the DSC 20 goes to step SP213 and causes the LCD 26 to display a reconnection request screen 200 shown in FIG. 14. The reconnection request screen 200 displays a sentence 201 prompting the user manually to operate on the PC 34 to reestablish connection with the DSC 20.

By having the reconnection request screen 200 thus displayed, the DSC 20 requests the user to operate on the PC 34 to reconnect with the DSC 20. In reality, operating on the PC 34 to reestablish connection with the DSC 20 involves first manipulating the OS of the PC 34 to disconnect the DSC on a software basis, then physically removing the DSC 20 from the PC 34, and finally reconnecting the DSC 20 to the PC 34 physically. These are the operations that the user is requested by the DSC 20 to carry out.

Incidentally, the DSC 20 using a reset signal may automatically effect the reconnecting process with the PC 34 as with the second embodiment. In that case, however, communication could be interrupted halfway, which might destroy the data written to the flash memory 42 of the DSC 20.

By contrast, when connection is reestablished from the side of the PC 34, the PC 34 allows the user to disconnect the DSC 20 at the end of the communication. This helps prevent the stored data from getting destroyed.

Following display of the reconnection request screen 200, the CPU 41 of the DSC 20 goes to step SP214. In step SP214, the CPU 41 waits for the reconnection to be reestablished. When the reconnection is found complete, the result of the check in step SP214 becomes affirmative. The CPU 41 then returns to step SP203.

Back in step SP203, the CPU 41 again sends to the PC 34 the configuration descriptor saying that the DSC 20 is a Bp device in need of the VBUS current of up to 500 mA, so that the DSC 20 may operate on the power from the PC 34 alone. This is how the DSC 20 connects with the PC 34 using the DSC-side connecting routine RT2.

As described, when the remaining battery level is sufficiently high, the DSC 20 transmits to the PC 34 the configuration descriptor saying that the DSC 20 is an Sp device illustratively in need of the VBUS current of up to 100 mA in compliance with the USB standard. If the remaining battery level is found insufficient, the DSC 20 sends to the PC 34 the configuration descriptor saying that the DSC 20 is a Bp device in need of the VBUS current of up to 500 mA.

That is, as long as the remaining battery level is sufficiently high, the DSC 20 sends its configuration descriptor to the PC 34 as stipulated by the USB standard and operates from the battery. This makes it possible for the DSC 20, which is in fact an Sp device under the USB standard, to declare itself a Bp device and draw the VBUS current of 500 mA from the PC only when the remaining battery level is insufficient.

4. Other Embodiments

4-1. Other Embodiments

First Variation

According to the second embodiment discussed above, upon elapse of a predetermined time period after the PC 34 was requested to supply the VBUS current of up to 500 mA, with the request left unfulfilled by the PC 34, there are two options: either permission to draw the VBUS current is awaited continuously, or the user is prompted to change the request.

Alternatively, if the request for permission to tap the VBUS current of up to 500 mA from the PC 34 is not fulfilled by the latter upon elapse of the predetermined time period, that request may be changed automatically.

Specifically, suppose that the CPU 41 of the DSC 20 finds the result of the check in step SP105 to be affirmative during execution of the DSC-side connecting routine RT1 shown in FIG. 11. That means permission to draw the VBUS current of 500 mA is not granted upon elapse of the predetermined time period following transmission by the DSC 20 of the configuration descriptor to the PC 34 requesting the VBUS current of up to 500 mA from the latter.

At this point, the CPU 41 may skip steps SP106 and SP107 to reach step SP108 immediately and carry out the reconnecting process with the PC 34. Then the CPU 41 may go to step SP109 and transmit to the PC 34 the configuration descriptor saying that the VBUS current of up to 500 mA is needed. This eliminates the need for the user's operations on the time-out screen 100 shown in FIG. 12.

In the case above, the time to be set on the timer may be made longer (e.g., 8 seconds) than with the second embodiment (e.g., 5 seconds). That is because the request to tap the VBUS current of up to 500 mA is found to be denied automatically upon elapse of the predetermined time period.

Also in the case above, the user may alternatively be notified that the attempt to draw the VBUS current of 500 mA from the PC 34 has failed and that the DSC 20 is now operating from the battery. More specifically, the CPU 41 of the DSC 20 may get the LCD 26 to display a sentence to that effect to give the notification.

As another alternative, a menu screen (not shown) of the DSC 20 may be arranged to offer the diverse alternatives to choose from upon elapse of the predetermined time period: to wait continuously for permission to draw the current, to change the request selectively, or to have the request changed automatically.

4-2. Other Embodiments

Second Variation

According to the second embodiment discussed above, upon elapse of the predetermined time period after the PC 34 was requested to supply the VBUS current of up to 500 mA, with the request left unfulfilled by the PC 34, the time-out screen 100 is displayed. By the time-out screen 100, the user is prompted to select whether or not to tap the VBUS current of 500 mA from the PC 34.

Figure 15:
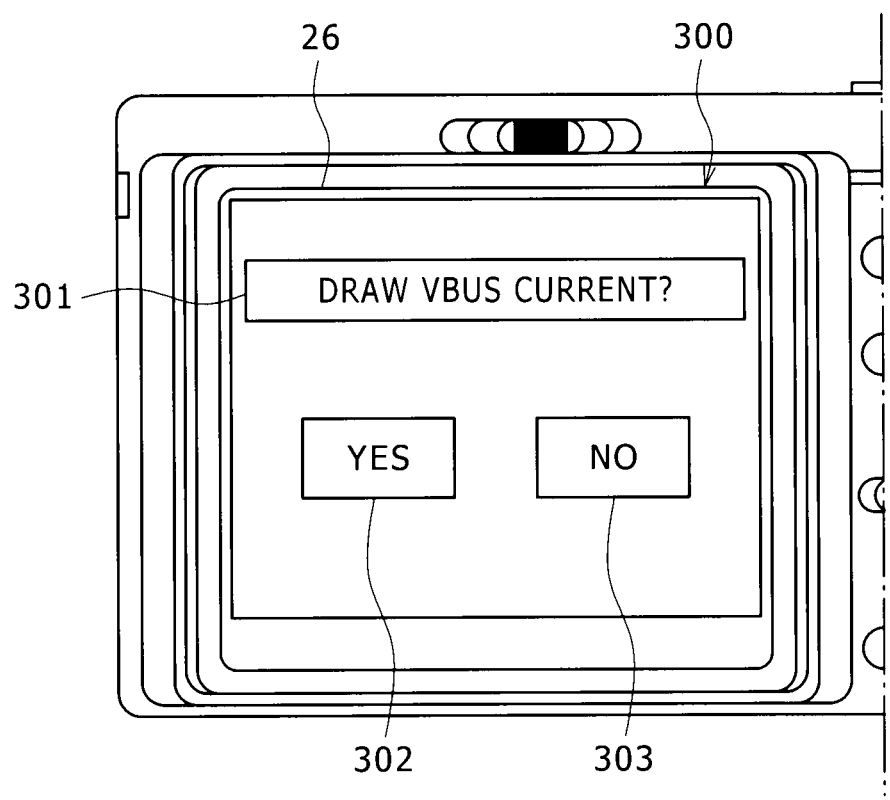
FIG. 15 is a schematic view showing a structure of a VBUS power use setting screen.

Alternatively, whether or not to draw the VBUS current of 500 mA from the PC may be selected beforehand on a VBUS power use setting screen 300 shown in FIG. 15. The VBUS power use setting screen 300 is displayed by pressing a VBUS power use setting button 30.

The VBUS power use setting screen 300 displays a query sentence 301, a YES button 302, and a NO button 303. The query sentence 301 prompts the user to select whether or not to draw the VBUS current of 500 mA from the PC 34. Pressing the YES button 302 gives the affirmative response to the query; the NO button 303 is for giving the negative response to the query.

If the YES button 302 is pressed, the CPU 41 of the DSC 20 writes to the flash memory 42 VBUS power use setting information specifying that the VBUS current of 500 mA is to be drawn from the PC 34. If the NO button 303 is pressed, then the CPU 41 of the DSC 20 writes to the flash memory 42 VBUS power use setting information specifying that the VBUS current of 500 mA will not be drawn from the PC 34.

By having such VBUS power use setting information written to the flash memory 42, the DSC 20 determines beforehand whether or not the VBUS current of 500 mA should be drawn from the PC 34. Later, when the DSC 20 is connected with the PC 34 and the configuration descriptor is requested by the PC 34, the CPU 41 of the DSC 20 references the VBUS power use setting information stored in the flash memory 42.

Suppose that the VBUS power use setting information specifies that the VBUS current of 500 mA is to be drawn from the PC 34. In that case, the CPU 41 sends back to the PC 34 the configuration descriptor saying that the DSC 20 is a Bp device in need of the VBUS current of up to 500 mA. As a result, the DSC 20 operates at the VBUS current of 500 mA tapped from the PC 34.

Meanwhile, suppose that the VBUS power use setting information specifies that the VBUS current of 500 mA is not to be drawn from the PC 34. In such a case, the CPU 41 sends back to the PC 34 the configuration descriptor saying that the DSC 20 is an Sp device in need of the VBUS current of up to 100 mA. As a result, the DSC 20 operates from the battery without drawing the VBUS current from the PC 34.

In the manner described above, where it is known from the start that the DSC 20 is about to be connected to a PC 34 incapable of supplying the VBUS current of 500 mA, it can be determined beforehand that the VBUS current will not be tapped from the PC 34.

4-3. Other Embodiments

Third Variation

According to the above-described first through third embodiments, when the PC 34 requests the DSC 20 to furnish a configuration descriptor, the DSC 20 sends back a single configuration descriptor to the PC 34. Alternatively, the DSC 20 may return a plurality of configuration descriptors to the PC 34. For example, the DSC 20 may furnish two configuration descriptors, one saying that the DSC 20 is a Bp device in need of the VBUS current of 500 mA, the other descriptor saying that the DSC 20 is an Sp device in need of the VBUS current of 100 mA.

When a plurality of configuration descriptors are sent back, the PC 34 selects one of the configuration descriptors. The PC 34 proceeds to issue Set_Configuration with regard to the selected configuration descriptor, thereby permitting connection based on the selected configuration descriptor.

As another alternative, where the DSC 20 is a terminal apparatus capable of sending back a plurality of configuration descriptors, the DSC 20 may be configured to determine selectively which of the configuration descriptors is to be returned to the host device.

For example, the DSC 20 may be configured to support a plurality of USB protocols and be capable of sending back a configuration descriptor specific to each of the protocols. More specifically, the DSC 20 may comply with three USB protocols: the mass storage protocol, PTP (Picture Transfer Protocol), and PictBridge protocol.

The mass storage protocol is a protocol according to which the PC 34 recognizes the DSC 20 as a drive. The PTP is a protocol under which the PC 34 controls camera control over the DSC 20. The PictBridge protocol is a protocol which, when the DSC 20 is connected to a printer (not shown), allows the DSC 20 to have the printer directly print pictures without the intervention of the PC 34.

Figure 16:
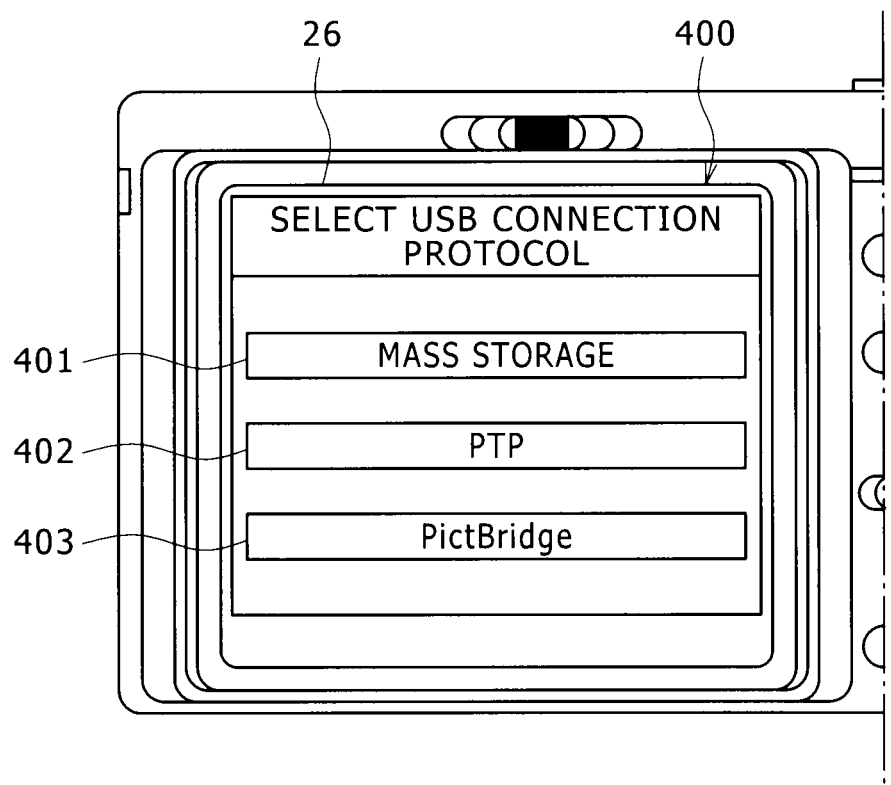
FIG. 16 is a schematic view showing a structure of a USB connection setting screen.

When the USB connection setting button 29 is pressed, the DSC 20 causes the LCD 26 to display a USB connection setting screen 400 shown in FIG. 16. The USB connection setting screen 400 displays a button 401 for selecting the mass storage protocol, a button 402 for selecting the PTP, and a button 403 for selecting the PictBridge protocol.

When the button 401 is pressed, the CPU 41 of the DSC 20 writes to the flash memory 42 the USB connection setting information stipulating that connection be established with the host device in accordance with the mass storage protocol. When the button 402 is pressed, the CPU 41 writes to the flash memory 42 the USB connection setting information stipulating that connection be established with the host device according to the PTP protocol. When the button 403 is pressed, the CPU 41 writes to the flash memory 42 the USB connection setting information stipulating that connection be established with the host device in keeping with the PictBridge protocol.

Later, when the DSC 20 is connected to the host device, with the host device requesting the configuration descriptor from the DSC 20, the CPU 41 of the DSC 20 references the USB connection setting information stored in the flash memory 42. The CPU 41 sends back to the host device the configuration descriptor in accordance with the USB protocol designated in the USE connection setting information.

For example, suppose that the USB protocol designated in the USB connection setting information is the mass storage protocol. In this case, the DSC 20 should preferably operate on the power from the host device mainly so as to prevent the disruption of communication with the host device halfway. Thus the CPU 41 sends back to the PC 34 the configuration descriptor saying that the DSC 20 is a Bp device in need of the VBUS current of up to 500 mA. Consequently the DSC 20 operates at the VBUS current of 500 mA drawn from the host device.

Suppose now that the USB protocol designated in the USB connection setting information is the PTP. In such a case, the DSC 20 should preferably operate from the battery primarily out of fear that the power from the host device may not be sufficient for effecting camera control. Thus the CPU 41 sends back to the PC 34 the configuration descriptor saying that the DSC 20 is an Sp device in need of the VBUS current of up to 100 mA. Consequently the DSC 20 operates from the battery without drawing the VBUS current from the host device.

In the manner described above, when the DSC 20 is connected to the host device illustratively in accordance with the PTP protocol, it can be determined in advance that the VBUS current will not be drawn from the host device.

4-4. Other Embodiments

Fourth Variation

According to the above-described third embodiment, when the remaining battery level drops, the reconnection request screen 200 is displayed prompting the user to reestablish connection between the PC 34 and the DSC 20 by operating on the PC 34.

Alternatively, as with the second embodiment, connection may be reestablished automatically from the DSC 20. In this case, the CPU 41 of the DSC 20 may monitor the D+ signal line 51 and the D- signal line 52 through the USB controller 48 and USB PHY 50. When data is not found being exchanged over the D+ signal line 51 and the D- signal line 52, the CPU 41 may proceed to reestablish connection with the PC 34.

In that way, connection can be reestablished while the disruption of communication between the DSC 20 and the PC 34 is prevented in order to preserve the data written to the flash memory 42.

According to the above-described second embodiment, the DSC 20 reestablishes connection with the PC 34 by sending the reset signal to the latter. However, this method of reestablishing connection is not limitative of the present invention. Alternatively, many other suitable methods of reestablishing connection may be adopted.

4-5. Other Embodiments

Fifth Variation

According to the above-described first through third embodiments, the DSC 20 is assumed to be a terminal apparatus operating on the power of 5 V, 500 mA. Alternatively, the DSC 20 may be a terminal apparatus operating at currents of less than 500 mA. As another alternative, the DSC 20 may utilize the power of 5 V, 500 mA obtained from the PC 34 to recharge the battery 54 in a manner guaranteeing the normal performance of the relevant components.

Also according to the above-described first through third embodiments, the DSC 20 is arranged to operate on the power of 5 V, 500 mA if that power is made available from the PC 34 upon connection therewith. Alternatively, if the external power source 55 is found to be attached upon connection with the PC 34, the DSC 20 may operate on the power from the external power source 55, notifying the PC 34 that the maximum VBUS current required is 100 mA.

Furthermore, according to the above-described first through third embodiments, the DSC 20 is arranged to operate from the battery if the VBUS current of 500 mA is not made available from the PC 34. Alternatively, even with the battery being tapped, the VBUS current of up to 100 mA is supposed to be available. If this VBUS current of 100 mA is utilized, this makes it possible to draw only what is lacking in power from the battery 54. This translates into further savings in the power dissipation of the battery 54.

4-6. Other Embodiments

Sixth Variation

Also according to the above-described first through third embodiments, the USB is adopted as the interface for connecting the DSC 20 with the PC 34. Alternatively, any interface other than the USB may be adopted provided it ensures communication between the DSC 20 and the PC 34 and enables the supply of power from the PC 34 to the DSC 20.

The PC 34 acting as the host device grants supply of the power of 5 V, 100 mA to the DSC 20 if the latter gives notification that it is an Sp device, and permits supply of the power of 5 V, 500 mA to the DSC 20 if the latter gives notification that it is a Bp device.

The above settings are established under the current USB standard and are thus not subject to future USB specifications or other interface standards. Furthermore, the host device is not limited to the PC 34; it can be a printer, a TV set, a game machine, or some other suitable device.

4-7. Other Embodiments

Seventh Variation

According to the above-described first through third embodiments and the first through the sixth variations outlined above, the DSC 20 acting as the terminal apparatus 1 is provided with the battery 54 serving as the battery 2. Also, the DSC 20 is furnished with the USB controller 48, USB PHY 50, and USB connector 24 constituting the USB port 3. The DSC 20 further includes the CPU 41 serving as the control section 4 and remaining battery level detecting section 7.

Alternatively, the above-mentioned components of the DSC 20 may be replaced by diverse hardware and/or software elements as long as they provide equivalent capabilities.

The present invention may be applied to other terminal apparatuses having functions equivalent to those of the above-described DSC 20. Such terminal apparatuses may include digital audio players, digital video cameras, game machines, and portable hard disk drives.

4-8. Other Embodiments

Eighth Variation

The above-described first through third embodiments and the first through the seventh variations outlined above are not limitative of the present invention. That is, the present invention also applies to any combination of, and any extraction from, part or all of the first through the third embodiments and the first through the seventh variations.

For example, the third embodiment of the present invention may be combined with the second variation of the invention. That is, the DSC-side connecting routine RT2 of the third embodiment may be executed only when the VBUS current of 500 mA is selected to be tapped through the VBUS power use setting screen 300.

The present invention may thus be practiced extensively on terminal apparatuses that acquire power from the host device connected through the USE port.

The present application contains subject matter related to that disclosed in Japanese Priority Patent Application JP 2008-316071 filed in the Japan Patent Office on Dec. 11, 2008, the entire content of which is hereby incorporated by reference.

It should be understood by those skilled in the art that various modifications, combinations, sub-combinations and alternations may occur depending on design requirements and other factors insofar as they are within the scope of the appended claims or the equivalent thereof.

What is claimed is:

1. A terminal apparatus designed as a self-powered device according to the Universal Serial Bus standard, said terminal apparatus comprising:
   a battery;
   a USB port; and
   a control section configured to allow relevant components of said terminal apparatus to operate on power from said battery upon power-up, said control section further notifying a host device upon connection thereto through said USB port that said terminal apparatus is a bus-powered device, in order to request a current necessary for said relevant components to operate only on the power supplied from said host device to the bus-powered device, wherein
   if the current necessary for operating said relevant components is not available from said host device through said USB port, then said control section causes said relevant components to operate on the power from said battery, said control section further replacing the power from said battery with the power acquired from said host device if said host device can supply the current necessary for operating said relevant components, and
   if the current necessary for operating said relevant components is not available from said host device upon elapse of a predetermined time period after the request for the necessary current was made, then said control section causes a display section to display a screen on which to select whether or not to acquire from said host device the current necessary for operating said relevant components, said control section further waiting continuously for the necessary current to be supplied by said host device if the necessary current is selected to be acquired from said host device by operations made on said screen, said control section further notifying said host device that said terminal apparatus is a self-powered device if the necessary current is not selected to be acquired, in order to request said host device to supply a current commensurate with the self-powered device.

2. The terminal apparatus according to claim 1, wherein, if the current necessary for operating said relevant components is not selected to be acquired from said host device by operations made on said screen, then said control section performs a reconnection with said host device before notifying said host device that said terminal apparatus is a self-powered device, in order to request said host device to supply the current commensurate with the self-powered device.

3. The terminal apparatus according to claim 1, wherein said control section makes settings for either acquiring or not acquiring the current necessary for operating said relevant components from said host device in response to predetermined operations, said control section further notifying said host device that said terminal apparatus is a bus-powered device in need of the current necessary for operating said relevant components if the necessary current is selected to be acquired from said host device, said control section further notifying said host device that said terminal apparatus is a self-powered device and requires a current commensurate therewith if the current necessary for operating said relevant components is not selected to be acquired from said host device.

4. The terminal apparatus according to claim 1, further comprising
   a remaining battery level detecting section configured to detect the remaining level of said battery;
   wherein said control section notifies said host device that said terminal apparatus is a bus-powered device and requests said host device to supply the current necessary for operating said relevant components if the remaining battery level detected by said remaining battery level detecting section is lower than a predetermined level, said control section further notifying said host device that said terminal apparatus is a self-powered device and requests said host device to supply a current commensurate with the self-powered device if the remaining battery level detected by said remaining battery level detecting section is equal to or higher than said predetermined level.

5. The terminal apparatus according to claim 1, wherein, when said host device connected via said USB port goes into suspend status, said control section causes said relevant components to operate on the power from said battery.

6. The terminal apparatus according to claim 1, wherein, when said USB port is compatible with a plurality of USB protocols, said control section selects one of said plurality of USB protocols and changes the type of device to be reported to said host device as well as the current to be requested of said host device in accordance with the selected USB protocol.

7. The terminal apparatus according to claim 1, wherein, when the current necessary for operating said relevant components is acquired from said host device, said control section utilizes the power available from said host device for recharging said battery in a manner guaranteeing normal performance of said relevant components.

8. The terminal apparatus according to claim 1, wherein said first communication is sent to said host device in response to a configuration request initially received from said host device upon connection to said host device.

9. The terminal apparatus according to claim 8, wherein said first communication includes a data set that describes a plurality of settings of said terminal apparatus.

10. The terminal apparatus according to claim 9, wherein said data set includes one byte settings that indicate whether said terminal apparatus is a self-powered device or a bus-powered device.

11. The terminal apparatus according to claim 1, wherein said first communication is sent to said host device prior to said terminal apparatus entering a USB powered state.

12. The terminal apparatus according to claim 1, wherein said first communication is sent to said host device prior to said terminal apparatus entering a USB default state.

13. The terminal apparatus according to claim 1, wherein said first communication is sent to said host device prior to said terminal apparatus entering a USB addressed state.

14. The terminal apparatus according to claim 1, wherein said first communication is sent to said host device prior to said terminal apparatus entering a USB configured state.

15. A terminal apparatus controlling method for use with a terminal apparatus designed as a self-powered device according to the Universal Serial Bus standard and including a battery, a USB port and a control section, said terminal apparatus controlling method comprising:
  causing said control section to allow relevant components of said terminal apparatus to operate on power from said battery upon power-up; and
  causing said control section to notify a host device in a first communication upon connection thereto through said USB port that said terminal apparatus is a bus-powered device, in order to request a current necessary for said relevant components to operate only on the power supplied from said host device to the bus-powered device, wherein
  if the current necessary for operating said relevant components is not available from said host device through said USB port, then causing said control section to allow said relevant components to operate on the power from said battery, and causing said control section to replace the power from said battery with the power acquired from said host device if said host device can supply the current necessary for operating said relevant components, and
  if the current necessary for operating said relevant components is not available from said host device upon elapse of a predetermined time period after the request for the necessary current was made, then causing said control section to control a display section to display a screen on which to select whether or not to acquire from said host device the current necessary for operating said relevant components, said control section further waiting continuously for the necessary current to be supplied by said host device if the necessary current is selected to be acquired from said host device by operations made on said screen, and causing said control section to notify said host device that said terminal apparatus is a self-powered device if the necessary current is not selected to be acquired, in order to request said host device to supply a current commensurate with the self-powered device.

16. A non-transitory computer-readable medium including a control program for performing a control procedure of a terminal apparatus designed as a self-powered device according to the Universal Serial Bus standard and including a battery, a USB port and a control section, said control procedure comprising:
  causing said control section to allow relevant components of said terminal apparatus to operate on power from said battery upon power-up; and
  causing said control section to notify a host device in a first communication upon connection thereto through said USB port that said terminal apparatus is a bus-powered device, in order to request a current necessary for said relevant components to operate only on the power supplied from said host device to the bus-powered device, wherein
  if the current necessary for operating said relevant components is not available from said host device through said USB port, then causing said control section to allow said relevant components to operate on the power from said battery, and causing said control section to replace the power from said battery with the power acquired from said host device if said host device can supply the current necessary for operating said relevant components, and
  if the current necessary for operating said relevant components is not available from said host device upon elapse of a predetermined time period after the request for the necessary current was made, then causing said control section to control a display section to display a screen on which to select whether or not to acquire from said host device the current necessary for operating said relevant components, said control section further waiting continuously for the necessary current to be supplied by said host device if the necessary current is selected to be acquired from said host device by operations made on said screen, and causing said control section to notify said host device that said terminal apparatus is a self-powered device if the necessary current is not selected to be acquired, in order to request said host device to supply a current commensurate with the self-powered device.

* * * * *